US012562785B2

(12) United States Patent
Lee et al.

(10) Patent No.: US 12,562,785 B2
(45) Date of Patent: Feb. 24, 2026

(54) METHOD AND APPARATUS FOR REPEATER BEAM CONFIGURATION IN WIRELESS COMMUNICATION SYSTEM

(71) Applicant: Samsung Electronics Co., Ltd., Suwon-si (KR)

(72) Inventors: Kyunggyu Lee, Suwon-si (KR); Heedon Gha, Suwon-si (KR); Taehan Bae, Suwon-si (KR); Seongmok Lim, Suwon-si (KR); Yeongeun Lim, Suwon-si (KR); Youngrok Jang, Suwon-si (KR); Hyoungju Ji, Suwon-si (KR); Kyungjun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/392,377

(22) Filed: Dec. 21, 2023

(65) Prior Publication Data
US 2024/0235625 A1     Jul. 11, 2024

(30) Foreign Application Priority Data
Dec. 22, 2022     (KR) ........................ 10-2022-0182217

(51) Int. Cl.
H04B 7/0426     (2017.01)
H04B 7/06     (2006.01)
(Continued)

(52) U.S. Cl.
CPC ......... *H04B 7/0439* (2013.01); *H04B 7/0695* (2013.01); *H04L 1/1812* (2013.01); *H04L 5/0055* (2013.01); *H04L 5/0098* (2013.01)

(58) Field of Classification Search
CPC .............. H04B 7/0695; H04B 7/15542; H04B 7/15557; H04L 1/1812; H04L 5/0055;
(Continued)

(56) References Cited

U.S. PATENT DOCUMENTS

2023/0268982 A1* 8/2023 Li ...................... H04B 7/15507
                                                                        370/315
2024/0049239 A1* 2/2024 Bai ........................ H04L 5/0091
(Continued)

FOREIGN PATENT DOCUMENTS

KR     10-2023-0132338 A     9/2023
WO     2022/253993 A2     12/2022
(Continued)

OTHER PUBLICATIONS

R1-2211020, Discussion on side control information to enable NR network-controlled repeaters, vivo, 3GPP TSG RAN WG1 #111, Toulouse, France, Nov. 14-18, 2022 (Year: 2022).*
(Continued)

*Primary Examiner* — Aristocratis Fotakis
(74) *Attorney, Agent, or Firm* — Jefferson IP Law, LLP

(57)     ABSTRACT

The disclosure relates to a 5G or 6G communication system for supporting a higher data transmission rate. A method performed by a network-controlled repeater (NCR) in a communication system is provided. The method includes receiving, from a base station via radio resource control information (RRC) message, configuration of one or more sets of forwarding resources for an access link, and receiving, from the base station, medium access control control element (MAC CE) indicating a set of forwarding resources among the one or more sets of forwarding resources, wherein the set of forwarding resources includes at least one forwarding resource, wherein each of the at least one forwarding resource is associated with a time resource and a beam index, and wherein the MAC CE includes a bit field indicating activation or deactivation of the set of forwarding resources.

16 Claims, 21 Drawing Sheets

(51) Int. Cl.
*H04L 1/1812* (2023.01)
*H04L 5/00* (2006.01)
(58) Field of Classification Search
CPC .... H04L 5/0098; H04W 88/04; H04W 72/232
See application file for complete search history.

(56) References Cited

U.S. PATENT DOCUMENTS

| | | | | |
|---|---|---|---|---|
| 2024/0147278 A1* | 5/2024 | Santhappan | .......... | H04W 24/08 |
| 2025/0062823 A1* | 2/2025 | Yan | .................... | H04B 7/15542 |
| 2025/0175879 A1* | 5/2025 | Tsai | .................. | H04B 7/15542 |
| 2025/0175968 A1* | 5/2025 | Zheng | .............. | H04W 72/0446 |
| 2025/0247715 A1* | 7/2025 | You | ........................ | H04B 7/155 |

FOREIGN PATENT DOCUMENTS

| | | | | | | |
|---|---|---|---|---|---|---|
| WO | 2023/172053 | A1 | | 9/2023 | | |
| WO | WO-2023200230 | A1 | * | 10/2023 | ......... | H04B 7/15528 |
| WO | WO-2024018849 | A1 | * | 1/2024 | ......... | H04B 7/06968 |
| WO | WO-2024102627 | A1 | * | 5/2024 | .......... | H04B 7/0695 |

OTHER PUBLICATIONS

R1-2212344, Side-control information and NCR behaviour, Ericsson, 3GPP TSG RAN WG1 #111, Toulouse, France, Nov. 14-18, 2022 (Year: 2022).*

3GPP TR 38.867 V18.0.0, 3rd Generation Partnership Project; Technical Specification Group Radio Access network; Study on NR network-controlled repeaters; (Release 18), Sep. 2022.

Huawei et al., Side control information and behaviors for network-controlled repeaters, R1-2210882, 3GPP TSG-RAN WG1 Meeting #111, Toulouse, France, Nov. 7, 2022.

Fujitsu, Discussion on side control information and NCR behavior, R1-2211080, 3GPP TSG RAN WG1 #111, Toulouse, France, Nov. 7, 2022.

Moderator (ZTE), Summary#4 of discussion on side control information, R1-2212786, 3GPP TSG RAN WG1 #111, Toulouse, France, Nov. 17, 2022.

Samsung, Discussion on side control information and NCR behavior, R1-2212058, 3GPP TSG RAN WG1 #111, Toulouse, France, Nov. 7, 2022.

International Search Report dated Mar. 22, 2024, issued in International Application No. PCT/KR2023/021275.

* cited by examiner

FIG. 12

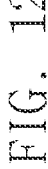

RRC [12-00]

[12-01] [12-02]

| List0 | • { Access link beam index (or TCI state)#0, Time resource#0} |
| | • { Access link beam index (or TCI state)#1, Time resource#1} |
| | • { Access link beam index (or TCI state)#2, Time resource#2} |
| List1 | • { Access link beam index (or TCI state)#3, Time resource#3} |
| List2 | • { Access link beam index (or TCI state)#4, Time resource#4} |

MAC-CE/SCI [12-10]

List0

Access link beam [12-20]

MAC-CE/SCI [12-10]

PUCCH [12-21]

Offset

[12-22]  [12-23]  [12-24]

Slot

Access link beam index#0
Access link beam index#1
Access link beam index#2

Resource#0 :{ Access link beam index (or TCI state)#0, Time resource#0)
Resource#1 :{ Access link beam index (or TCI state)#1, Time resource#1)
Resource#2 :{ Access link beam index (or TCI state)#2, Time resource#2)
Resource#3 :{ Access link beam index (or TCI state)#3, Time resource#3)
Resource#4 :{ Access link beam index (or TCI state)#4, Time resource#4)
Resource#5 :{ Access link beam index (or TCI state)#5, Time resource#5)
Resource#6 :{ Access link beam index (or TCI state)#6, Time resource#6)

RRC
[14-00]

Resource#0, Resource#3, Resource#6

MAC-CE/SCI
[14-10]

MAC-CE/SCI
[14-10]

Access link beam
[14-20]

MAC-CE/SCI
[14-10]

PUCCH
[14-21]

Offset

[14-22]

[14-23]

[14-24]

Slot

Access link beam index#0

Access link beam index#3

Access link beam index#6

FIG. 17
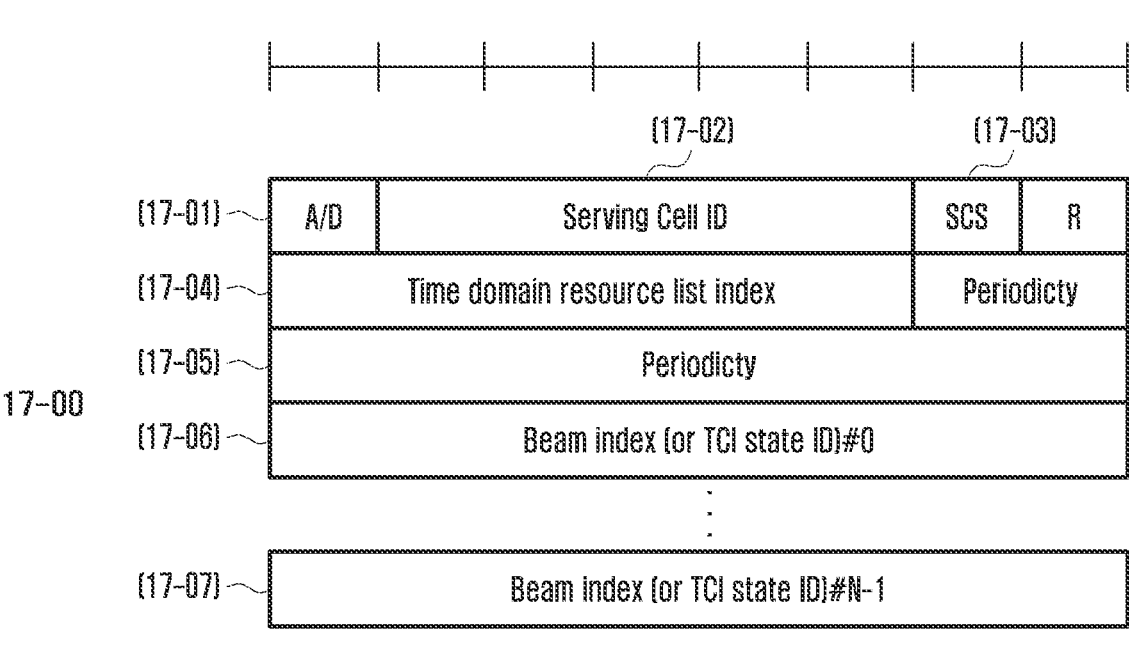
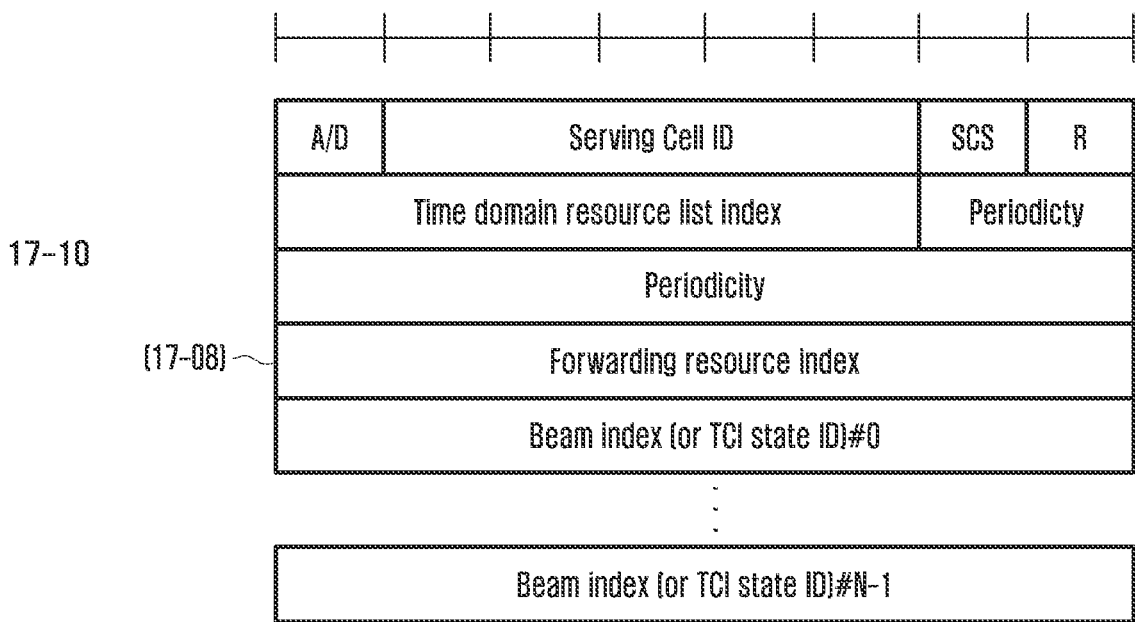

METHOD AND APPARATUS FOR REPEATER BEAM CONFIGURATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0182217, filed on Dec. 22, 2022, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for access link beam configuration for a network-controlled repeater in a wireless communication system.

2. Description of Related Art

Fifth-generation (5G) mobile communication technologies define broad frequency bands such that high transmission rates and new services are possible, and may be implemented not only in "Sub 6 gigahertz (GHz)" bands such as 3.5 GHz, but also in "Above 6 GHz" bands referred to as millimeter wave (mmWave) including 28 GHz and 39 GHz. Additionally, it has been considered to implement sixth-generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi-input multi-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Band-Width Part (BWP), new channel coding methods such as a Low Density Parity Check (LDPC) code for large amount of data transmission and a polar code for highly reliable transmission of control information, layer 2 (L2) pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user-equipment (UE) power saving, Non-Terrestrial Network (NTN) which is UE-satellite direct communication for providing coverage in an area in which communication with terrestrial networks is unavailable, and positioning.

Additionally, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method in which a base station performs access beam control operations of a network-controlled repeater via control signaling in a wireless communication system.

Additional aspects will be set forth in part in the description which follows and, in part, will be apparent from the description, or may be learned by practice of the presented embodiments.

In accordance with an aspect of the disclosure, a method performed by a network-controlled repeater (NCR) in a communication system is provided. The method includes receiving, from a base station via radio resource control information (RRC) message, configuration of one or more sets of forwarding resources for an access link, and receiving, from the base station, medium access control control element (MAC CE) indicating a set of forwarding resources among the one or more sets of forwarding resources, wherein the set of forwarding resources includes at least one forwarding resource, wherein each of the at least one forwarding resource is associated with a time resource and a beam index, and wherein the MAC CE includes a bit field indicating activation or deactivation of the set of forwarding resources.

In accordance with another aspect of the disclosure, a method performed by a base station in a communication system is provided. The method includes transmitting, to a network-controlled repeater (NCR) via radio resource control information (RRC) message, configuration of one or more sets of forwarding resources for an access link, and transmitting, to the NCR, medium access control control element (MAC CE) indicating a set of forwarding resources among the one or more sets of forwarding resources, wherein the set of forwarding resources includes at least one forwarding resource, wherein each of the at least one forwarding resource is associated with a time resource and a beam index, and wherein the MAC CE includes a bit field indicating activation or deactivation of the set of forwarding resources.

In accordance with another aspect of the disclosure, a network-controlled repeater (NCR) in a communication system is provided. The NCR includes a transceiver, and one or more processors coupled to the transceiver and configured to receive, from a base station via radio resource control information (RRC) message, configuration of one or more sets of forwarding resources for an access link, and receive, from the base station, medium access control control element (MAC CE) indicating a set of forwarding resources among the one or more sets of forwarding resources, wherein the set of forwarding resources includes at least one forwarding resource, wherein each of the at least one forwarding resource is associated with a time resource and a beam index, and wherein the MAC CE includes a bit field indicating activation or deactivation of the set of forwarding resources.

In accordance with another aspect of the disclosure, a base station in a communication system is provided. The base station includes a transceiver, and one or more processors coupled to the transceiver and configured to transmit, to a network-controlled repeater (NCR) via radio resource control information (RRC) message, configuration of one or more sets of forwarding resources for an access link, and transmit, to the NCR, medium access control control element (MAC CE) indicating a set of forwarding resources among the one or more sets of forwarding resources, wherein the set of forwarding resources includes at least one forwarding resource, wherein each of the at least one forwarding resource is associated with a time resource and a beam index, and wherein the MAC CE includes a bit field indicating activation or deactivation of the set of forwarding resources.

In accordance with another aspect of the disclosure, one or more non-transitory computer-readable storage media storing one or more computer programs including computer-executable instructions that, when executed by one or more processors of a network-controlled repeater (NCR), cause the NCR to perform operations are provided. The operations include receiving, from a base station via radio resource control information (RRC) message, configuration of one or more sets of forwarding resources for an access link; and receiving, from the base station, medium access control control element (MAC CE) indicating a set of forwarding resources among the one or more sets of forwarding resources, wherein the set of forwarding resources comprises at least one forwarding resource, wherein each of the at least one forwarding resource is associated with a time resource and a beam index, and wherein the MAC CE includes a bit field indicating activation or deactivation of the set of forwarding resources.

According to the disclosure, when a network-controlled repeater is able to perform an access link beam control operation under the control of a base station in a wireless communication system, higher coverage can be expected through adaptive beam configuration for an access link.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 illustrates an example relating to an access link beam indication of an NCR in a semi-persistent method according to an embodiment of the disclosure;

FIG. 14 illustrates an example relating to an access link beam indication of an NCR in a semi-persistent method according to an embodiment of the disclosure;

FIG. 17 illustrates an example relating to an access link beam indication of an NCR in a semi-persistent method via a MAC-CE according to an embodiment of the disclosure;

Throughout the drawings, it should be noted that like reference numbers are used to depict the same or similar elements, features, and structures.

DETAILED DESCRIPTION

Figure 1:
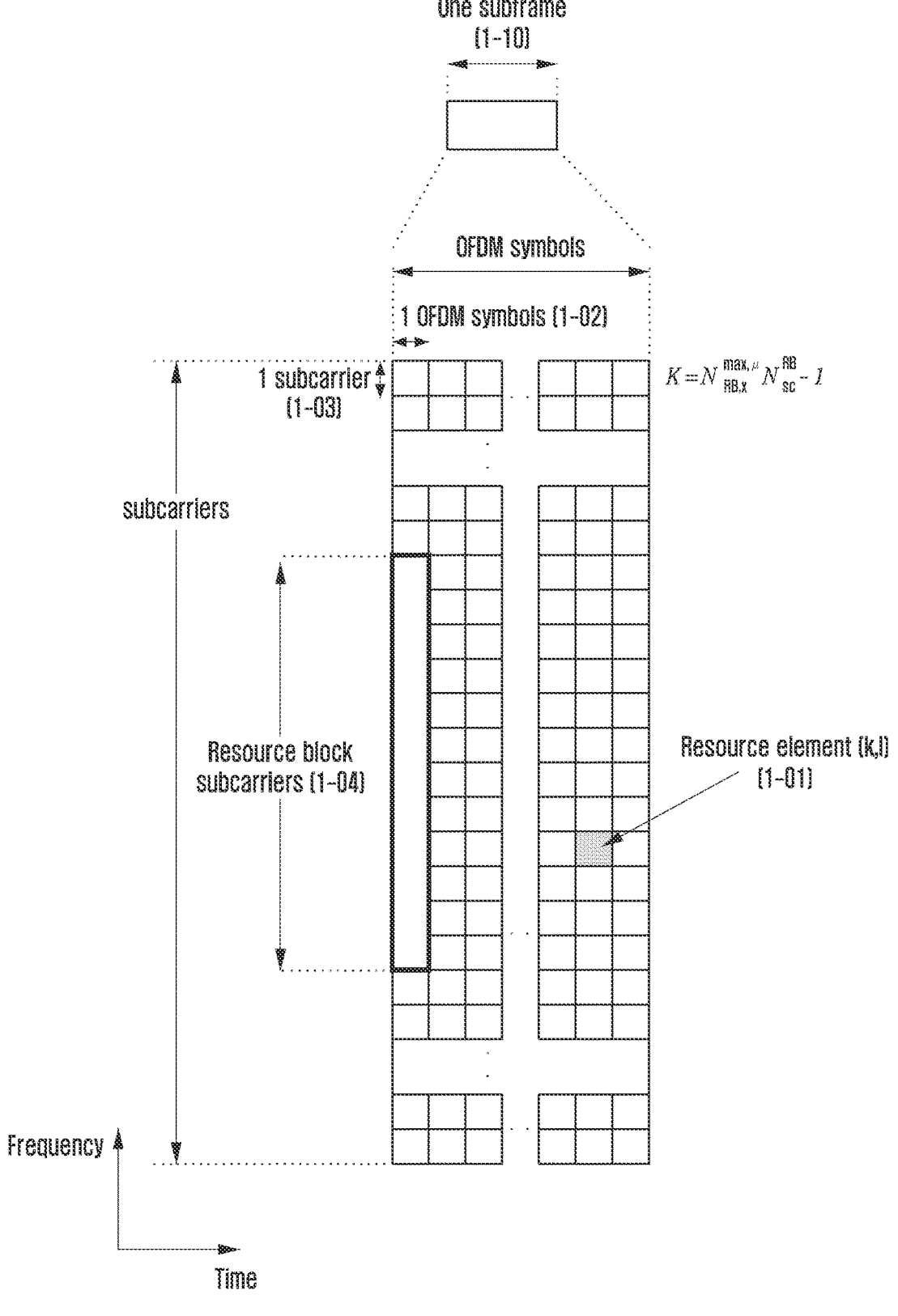
FIG. 1 illustrates a time-frequency domain transmission structure of long-term evolution (LTE) (LTE or evolved universal terrestrial radio access (E-UTRA)), LTE-Advanced (LTE-A), NR, or a wireless communication system similar thereto according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

In the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. The disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, may be implemented by one or more non-transitory computer-readable storage media storing one or more computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. In addition, the computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. In an example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. The "unit" does not always have a meaning limited to software or hardware. The "unit" may be constructed either to be stored in an addressable storage medium or to execute one or more processors. As such, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, according to some embodiments, the "unit" may include one or more processors.

The operation principle of the technical idea of the disclosure will be described in detail with reference to the accompanying drawings. In the following description of the technical idea of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. The definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Examples of the base station and the terminal are not limited thereto. In the following description of the disclosure, technology for receiving broadcast information from a base station by a terminal in a wireless communication system will be described. The disclosure relates to a communication technique for converging Internet of things (IoT) technology with 5th generation (5G) communication systems designed to support a higher data transfer rate beyond 4th generation (4G) systems, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

Terms referring to broadcast information, terms referring to control information, terms related to communication coverage, terms referring to state changes (e.g., an event), terms referring to network entities, terms referring to messages, terms referring to device elements, and the like are illustratively used for the sake of convenience. The disclosure is not limited by the terms as used below, and other terms referring to subjects having equivalent technical meanings may be used.

In the following description, some of terms and names defined in the 3rd generation partnership project long term evolution (3GPP LTE) standards may be used for the convenience of description. The disclosure is not limited by these terms and names, and may be applied in the same way to systems that conform other standards.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

In a typical example of a broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to various embodiments, eMBB aims at providing a data rate higher than that supported by existing LTE, LTE-A, or LTE-Pro. For example, in the 5G communication system, eMBB must provide a peak data rate of 20 gigabits per second (Gbps) in the downlink and a peak data rate of 10 Gbps in the uplink for a single base station. The 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 megahertz (MHz) in a frequency band of 3 to 6 GHz or 6 GHz or more, instead of transmitting signals using a transmission bandwidth up to 20 MHz in a band of 2 GHz used in LTE.

Additionally, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. The UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time because it is difficult to frequently replace the battery of the UE.

The URLLC, which is a cellular-based mission-critical wireless communication service, may be used for remote control for robots or machines, industrial automation, unmanned aerial vehicles, remote health care, emergency alert, and the like. The URLLC must provide communication with ultra-low latency and ultra-high reliability. For example, a service supporting URLLC must satisfy an air interface latency of less than 0.5 milliseconds (ms), and also requires a packet error rate of 10-5 or less. For the services supporting URLLC, a 5G system must provide a transmit time interval (TTI) shorter than those of other services, and also requires a design for assigning a large number of resources in a frequency band in order to secure reliability of a communication link. The above-described mMTC, URLLC, and eMBB are only examples of different types of services, and service types to which the disclosure is applicable are not limited to the above-described examples.

The above-described services considered in the 5G communication system must be converged with each other so as to be provided based on one framework. The respective services are preferably integrated into a single system and controlled and transmitted in the integrated single system, instead of being operated independently, for efficient resource management and control.

In the following description, an LTE, LTE-A, LTE Pro, or NR system will be described by way of example, but the embodiments of the disclosure may also be applied to other communication systems having similar technical backgrounds or channel types. In addition, based on determinations by those skilled in the art, the embodiments of the disclosure may also be applied to other communication systems through some modifications without significantly departing from the scope of the disclosure.

5G System Frame Structure

Hereinafter, a frame structure of a 5G system will be described in detail with reference to the drawings.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphical processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropro-cessor unit (MPU), a system on chip (SoC), an integrated circuit (IC), or the like.

FIG. 1 illustrates a basic structure of time-frequency resources in a wireless communication system according to an embodiment of the disclosure.

Referring to FIG. 1, a horizontal axis represents a time domain, and a vertical axis represents a frequency domain. A basic unit of a resource in the time-frequency domain is a resource element (RE) 1-01, which may be defined as one orthogonal frequency division multiplexing (OFDM) symbol 1-02 on a time axis and one subcarrier 1-03 on a frequency axis. In the frequency domain, $$N_{sc}^{RB}$$

(e.g., 12) consecutive REs may constitute one resource block (RB) 1-04. In one embodiment, a plurality of OFDM symbols may constitute one subframe 1-10.

Figure 2:
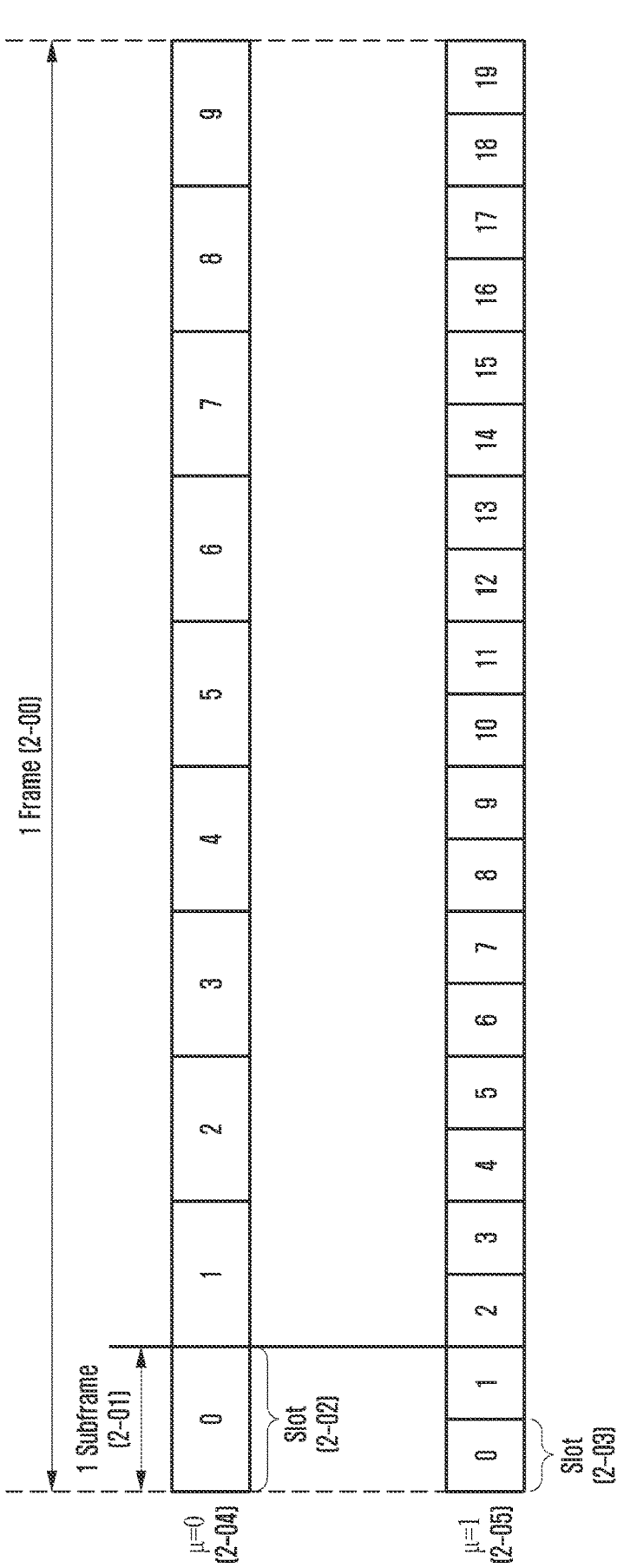
FIG. 2 illustrates structures of a frame, subframe, and a slot in 5th generation (5G) according to an embodiment of the disclosure.

FIG. 2 illustrates structures of a frame, a subframe, a slot in a wireless communication system according to an embodiment of the disclosure.

Referring to FIG. 2, one frame 2-00 may include one or more subframes 2-01, and one subframe may include one or more slots 2-02. In an example, one frame 2-00 may be defined as 10 ms. One subframe 2-01 may be defined as 1 ms, and in this case, one frame 2-00 may include a total of 10 subframes 2-01. One slot 2-02 or 2-03 may be defined as 14 OFDM symbols (that is, the number of symbols per slot $$\left(N_{symb}^{slot}\right) = 14\}.$$

One subframe 2-01 may include one or multiple slots 2-02 and 2-03, and the number of slots 2-02 and 2-03 for one subframe 2-01 may vary depending on a configuration value p of subcarrier spacing 2-04 or 2-05. The example of FIG. 2 shows the case of μ=0 (2-04) and the case of μ=1 (2-05) as a configuration value of subcarrier spacing. In the case of μ=0 (2-04), one subframe 2-01 may include one slot 2-02, and in the case of μ=1 (2-05), one subframe 2-01 may include two slots 2-03. The number subframe, of slots for one subframe $$\left(N_{slot}^{subframe,\mu}\right)$$

may vary depending on the configuration value μ of sub-carrier spacing, and the number of slots for each frame $$\left(N_{slot}^{frame,\mu}\right)$$

may vary according thereto.

$$N_{slot}^{subframe,\mu} \text{ and } N_{slot}^{frame,\mu}$$

depending on each configuration value μ of subcarrier spacing may be defined as shown in Table 1 below.

TABLE 1

| μ | $N_{symb}^{slot}$ | $N_{slot}^{frame, μ}$ | $N_{slot}^{subframe, μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include up to 250 RBs. In case that a UE always receives the overall serving cell bandwidth, such as LTE, power consumption by the UE may be severe, and in order to solve this problem, a base station may configure one or more bandwidth parts (BWPs) for the UE such that the UE is able to change a reception area in the cell. In NR, a base station may configure an "initial BWP", which is the bandwidth of CORESET #0{or common search space (CSS)}, for the UE through a master information block (MIB). The base station may then configure an initial BWP (first BWP) of the UE through RRC signaling, and may transmit a notification of one or more pieces of BWP configuration information that may be indicated through downlink control information (DCI) later. Thereafter, the base station may transmit a notification of a BWP ID through DCI, thereby indicating a band to be used by the UE. When the UE fails to receive DCI in the currently assigned BWP for a specific period of time or more, the UE returns to a "default BWP" and attempts to receive DCI.

5G Bandwidth Part

Figure 3:
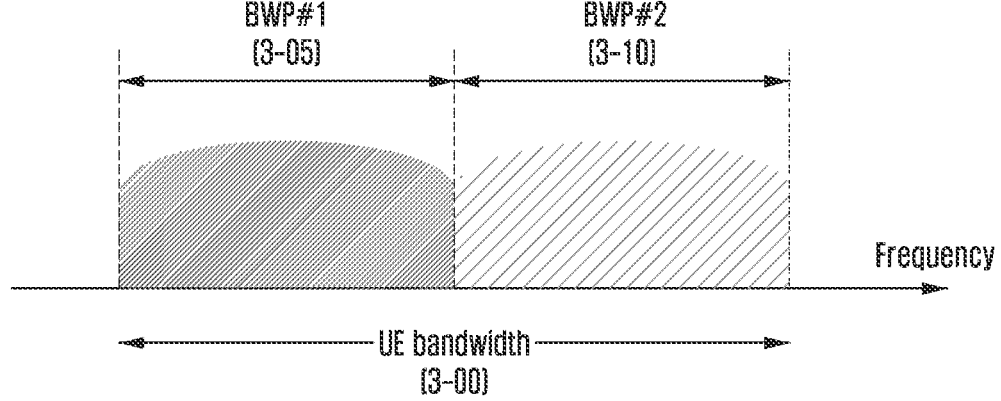
FIG. 3 illustrates an example of a bandwidth part configuration in a wireless communication system according to an embodiment of the disclosure.

FIG. 3 illustrates an example of the configuration of a bandwidth part (BWP) in a wireless communication system according to an embodiment of the disclosure.

Referring to FIG. 3, illustrates one example in which a UE bandwidth 3-00 is configured to have two bandwidth parts, that is, bandwidth part #1 3-05 and bandwidth part #2 3-10. A base station may configure one or more bandwidth parts for a UE, and may configure information on each bandwidth part as shown in Table 2 below.

TABLE 2

```
BWP ::=                        SEQUENCE {
    bwp-Id                         BWP-Id,
    (Bandwidth part identifier)
    locationAndBandwidth           INTEGER (1..65536),
    (Bandwidth part location)
    subcarrierSpacing              ENUMERATED {n0, n1, n2, n3, n4, n5},
    (Subcarrier spacing)
    cyclicPrefix         ENUMERATED { extended }
    (Cyclic prefix)
}
```

In addition to the configuration information described in Table 2, various parameters related to the bandwidth part may be configured for the UE. The base station may, for example, transmit the above information to the UE through higher layer signaling, for example, RRC signaling. At least one of the one or more configured bandwidth parts may be activated. Information on whether or not to activate the configured bandwidth part may be transmitted from the base station to the UE semi-statically through RRC signaling or dynamically through a MAC control element (CE) or DCI.

In an embodiment, an initial bandwidth part (BWP) for initial access may be configured for the UE prior to a radio resource control (RRC) connection by the base station through a master information block (MIB). Specifically, the UE may receive configuration information on a control resource set (CORESET) through which a physical downlink control channel (PDCCH) is able to be transmitted and a search space in order to receive system information that may correspond to remaining system information (RMSI) or system information block 1 (SIB1)) required for initial access through the MIB in the initial access stage. The control resource set and the search space configured using an MIB may be regarded as an identity (ID) "0", respectively.

The base station may, for example, notify the UE of configuration information, such as frequency assignment information, time assignment information, numerology, and the like, for control resource set #0 through an MIB. Additionally, the base station may notify the UE of configuration information on monitoring periodicity and an occasion for control resource set #0(i.e., configuration information on search space #0) through an MIB. The UE may regard the frequency domain configured with control resource set #0 obtained from the MIB as an initial bandwidth part for initial access. The identity (ID) of the initial bandwidth part may be regarded as 0.

Configuration of the bandwidth part supported by the next-generation mobile communication system (the 5G or NR system) may be used for various purposes.

In an example, in case that the bandwidth supported by the UE is smaller than the system bandwidth, the bandwidth supported by the UE may be supported by configuration of the bandwidth part. In another example, a frequency location of the bandwidth part (configuration information 2) may be configured for the UE in Table 2 so that the UE may transmit and receive data at a specific frequency location within the system bandwidth.

As yet another example, the base station may configure a plurality of bandwidth parts with respect to the UE for the purpose of supporting different numerologies. In order to support transmission and reception of data using a subcarrier spacing of 15 kHz and a subcarrier spacing of 30 kHz for any UE, two bandwidth parts may be configured to use a subcarrier spacing of 15 kHz and a subcarrier spacing of 30 kHz, respectively. In an embodiment, frequency division multiplexing may be performed on different bandwidth parts, and in the case of transmitting and receiving data with a specific subcarrier spacing, a bandwidth part configured with the corresponding subcarrier spacing may be activated.

In still another example, the base station may configure bandwidth parts having different bandwidths with respect to the UE for the purpose of reducing power consumption of the UE. If the UE supports a very large bandwidth, for example, a 100 MHz bandwidth and always transmits and receives data through the corresponding bandwidth, very high power consumption may be caused. In particular, it is very inefficient in terms of power consumption for the UE to monitor unnecessary downlink control channels with respect to a large bandwidth of 100 MHz in the absence of traffic. The base station may configure a bandwidth part having a relatively small bandwidth, for example, a 20 MHz bandwidth part for the UE for the purpose of reducing power consumption by the UE. In the absence of traffic, the UE may perform a monitoring operation in a 20 MHz bandwidth part, and, if data is produced, the UE may transmit and receive data using a 100 MHz bandwidth part according to the indication of the base station.

In a method of configuring the bandwidth part, UEs before RRC-connected may receive configuration information about an initial bandwidth part through a master information block (MIB) in the initial access stage. Specifically, the UE may receive, from the MIB of a physical broadcast channel (PBCH), a configuration of a control resource set (CORESET) for a downlink control channel through which downlink control information (DCI) for scheduling a system information block (SIB) is able to be transmitted. For example, the bandwidth of the control resource set configured through the MIB may be regarded as an initial bandwidth part, and the UE may receive a PDSCH through which an SIB is transmitted through the configured initial bandwidth part. The initial bandwidth part may be used for other system information (OSI), paging, and random access, as well as the reception of an SIB.

SSB/PBCH

Hereinafter, a synchronization signal (SS)/PBCH block (SSB) of a next-generation mobile communication system (the 5G or NR system) will be described.

The SS/PBCH block may indicate a physical layer channel block including a primary SS (PSS), a secondary SS (SSS), and a PBCH. Specifically, the SS/PBCH block may be defined as follows.

PSS: This is a reference signal for downlink time/frequency synchronization, and may provide some information of a cell ID.

SSS: This is a reference for downlink time/frequency synchronization, and may provide the remaining information of the cell ID, which is not provided by the PSS. Additionally, this may serve as a reference signal for demodulation of a PBCH.

PBCH: This may provide essential system information necessary for transmission and reception of a data channel and a control channel of the UE. The essential system information may include search space-related control information indicating radio resource mapping information of the control channel, scheduling control information for a separate data channel transmitting system information, and the like.

SS/PBCH block: The SS/PBCH block may be configured as a combination of the PSS, the SSS, and the PBCH. One or more SS/PBCH blocks may be transmitted within a time period of 5 ms, and each transmitted SS/PBCH block may be distinguished by an index.

In an embodiment, the UE may detect the PSS and the SSS in the initial access stage, and may decode the PBCH. The UE may acquire an MIB from the PBCH, and may receive a configuration of control resource set #0 through the MIB. The UE may assume that a selected SS/PBCH block and a demodulation reference signal (DMRS) transmitted in control resource set #0 have a relationship of quasi co-location (QCL), thereby monitoring control resource set #0. In another embodiment, the UE may receive system information through downlink control information transmitted from control resource set #0. The UE may obtain configuration information related to a random access channel (RACH), which is necessary for initial access, from the received system information. In yet another embodiment, the UE may transmit a physical RACH (PRACH) to the base station in consideration of the selected SS/PBCH index, and the base station receiving the PRACH may obtain information on the SS/PBCH block index selected by the UE. The base station may recognize which block has been selected by the UE from among the respective SS/PBCH blocks and monitoring of control resource set #0 corresponding to (or associated with) the SS/PBCH block selected by the UE.

PDCCH: DCI

Hereinafter, downlink control information (hereinafter referred to as "DCI") in a next-generation mobile communication system (the 5G or NR system) will be described in detail.

In the next-generation mobile communication system (the 5G or NR system), scheduling information on uplink data (or a physical uplink shared channel (PUSCH)) or downlink data (or a physical downlink data channel (PDSCH)) may be transmitted from a base station to a UE through DCI. The UE may, for example, monitor a DCI format for fallback and a DCI format for non-fallback with respect to a PUSCH or PDSCH. The DCI format for fallback may be configured as a fixed field that is predefined between the base station and the UE, and the DCI format for non-fallback may include a configurable field.

According to an embodiment, the DCI may be transmitted through a physical downlink control channel (PDCCH) after a channel coding and modulation process. A cyclic redundancy check (CRC) may be attached to the payload of a DCI message, and the CRC may be scrambled by a radio network temporary identifier (RNTI) corresponding to the identity of the UE. Different RNTIs may be used for scrambling the CRC attached to the payload of the DCI message according to the purpose of the DCI message, for example, transmission of UE-specific data, power control command, random access response, or the like. The RNTI may be included in the CRC calculation process, and may then be transmitted, instead of being explicitly transmitted. When the DCI message transmitted through the PDCCH is received, the UE may check the CRC using the assigned RNTI. When the CRC check result is correct, the UE may recognize that the message has been transmitted to the UE.

In an example, the DCI for scheduling a PDSCH for system information (SI) may be scrambled by an SI-RNTI. The DCI for scheduling a PDSCH for a random access response (RAR) message may be scrambled by an RA-RNTI. In another example, the DCI for scheduling a PDSCH for a paging message may be scrambled by a P-RNTI. The DCI for transmitting a notification of a slot format indicator (SFI) may be scrambled by an SFI-RNTI. DCI for transmitting a notification of transmit power control (TPC) may be scrambled by a TPC-RNTI. The DCI for scheduling UE-specific PDSCH or PUSCH may be scrambled by a cell-RNTI (C-RNTI).

DCI format 0_0 may be used as fallback DCI for scheduling a PUSCH, and in this case, the CRC may be scrambled by a C-RNTI. In one embodiment, DCI format 0_0 in which the CRC is scrambled by a C-RNTI may include information as shown in Table 3 below.

TABLE 3

Identifier for DCI formats - [1] bit
Frequency domain resource assignment -

$$\left[\left\lceil \log_2\left(N_{RB}^{UL,BWP}\left(N_{RB}^{UL,BWP} + 1\right)/2\right)\right\rceil\right] \text{ bits}$$

Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
UL/SUL indicator - 0 or 1 bit DCI format 01 may be used as non-fallback DCI for scheduling a PUSCH, and in this case, the CRC may be scrambled by a C-RNTI. In another embodiment, DCI format 0_1 in which the CRC is scrambled by a C-RNTI may include information as shown in Table 4 below.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}{}^{UL,BWP}/P \rceil$ bits
    For resource allocation type 1, $\lceil \log_2(N_{RB}{}^{UP,NWP}(N_{RB}{}^{UL,BWP} + 1)/2) \rceil$
bits
Time domain resource assignment -1, 2, 3, or 4 bits
VRB-to-PRB (virtual resource block-to-physical resource block)
mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK
    codebook.
2nd downlink assignment index - 0 or 2 bits
    2 bits for dynamic HARQ-ACK codebook with two HARQ-ACK
    sub-codebooks;
    0 bit otherwise.
TPC command for scheduled PUSCH - 2 bits $SRS$ resource indicator $- \left\lceil \log_2 \left( \sum_{k=1}^{L_{max}} \binom{N_{SRS}}{k} \right) \right\rceil$ or $\lceil \log_2(N_{SRS}) \rceil$ bits $\left\lceil \log_2 \left( \sum_{k=1}^{L_{max}} \binom{N_{SRS}}{k} \right) \right\rceil$ bits for non-codebook based $PUSCH$ transmission;
    $\lceil \log_2(N_{SRS}) \rceil$ bits for codebook based PUSCH transmission.
Precoding information and number of layers -up to 6 bits
Antenna ports - up to 5 bits
SRS request - 2 bits
CSI request - 0, 1, 2, 3, 4, 5, or 6 bits
CBG (code block group) transmission information - 0, 2, 4, 6, or 8 bits
PTRS-DMRS association (Phase tracking reference signal-
Demodulation reference signal association) - 0 or 2 bits.
    beta_offset indicator - 0 or 2 bits
    DMRS sequence initialization - 0 or 1 bit DCI format 1_0 may be used as fallback DCI for scheduling a PDSCH, and in this case, the CRC may be scrambled by a C-RNTI. In another embodiment, DCI format 1_0 in which the CRC is scrambled by a C-RNTI may include information as shown in Table 5 below.

TABLE 5

Identifier for DCI formats - [1] bit
Frequency domain resource assignment -

$[\lceil \log_2(N_{RB}^{DL,BWP}(N_{RB}^{DL,BWP} + 1)/2) \rceil]$ bits

Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH (physical uplink control channel, PUCCH) resource
indicator - 3 bits
PDSCH-to-HARQ feedback timing indicator - [3] bits Alternatively, DCI format 1_0 may be used as DCI for scheduling a PDSCH for an RAR message, and, the CRC may be scrambled by an RA-RNTI. DCI format 1_0 in which the CRC is scrambled by a C-RNTI may include information as shown in Table 6 below.

TABLE 6

Frequency domain resource assignment -

$[[\lceil \log_2(N_{RB}^{DL,BWP}(N_{RB}^{DL,BWP} + 1)/2) \rceil]]$ bits

Time domain resource assignment - 4 bits
VRB-to-PRB mapping - 1 bit
Modulation and coding scheme - 5 bits
TB scaling - 2 bit
Reserved bits - 16 bits DCI format 1_1 may be used as non-fallback DCI for scheduling a PDSCH, and in this case, the CRC may be scrambled by a C-RNTI. According to an embodiment, DCI format 1_1 in which the CRC is scrambled by a C-RNTI may include information as shown in Table 7 below.

TABLE 7

Carrier indicator - 0 or 3 bits
Identifier for DCI formats - [1] bits
Bandwidth part indicator - 0, 1 or 2 bits
Frequency domain resource assignment For resource allocation type 0, $\lceil N_{RB}^{DL,BWP}/P \rceil$ bits For resource allocation type 1, $\lceil \log_2(N_{RB}^{DL,BWP}(N_{RB}^{DL,BWP} + 1)/2) \rceil$ Time domain resource assignment -1, 2, 3, or 4 bits
VRB-to-PRB mapping - 0 or 1 bit, only for resource allocation type
1.
    0 bit if only resource allocation type 0 is configured;
    1 bit otherwise.
PRB (Physical resource block) bundling size indicator - 0 or 1 bit
Rate matching indicator - 0, 1, or 2 bits
ZP CSI-RS (Zero power channel state information reference signal)
trigger - 0, 1, or 2 bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG (code block group) flushing out information - 0 or 1 bit
DMRS sequence initialization - 1 bit Regarding QCL Prioritization Rule for PDCCH, PDSCH Hereinafter, an operation for determining a QCL priority for a PDCCH is described below.

When a UE operates with carrier aggregation in a single or band and a plurality of control resource sets existing within an activated BWP in a single cell or a plurality of cells overlap in the time while having the same or different QCL-TypeD characteristics in a specific PDCCH monitoring occasion, the UE may select a specific control resource set according to a QCL priority determination operation and monitor control resource sets having the same QCL-TypeD characteristic as the corresponding control resource set. In an example, a plurality of control resource sets overlap in the time, only one QCL-TypeD characteristic may be received. At this time, a reference to determining the QCL priority is described below.

Reference 1. Control resource set connected to a common search space having the lowest index within a cell corresponding to the lowest index among cells including the common search space.

Reference 2. Control resource set connected to a UE-specific search space having the lowest index within a cell corresponding to the lowest index among cells including the UE-specific search space.

When the corresponding references are not satisfied, the following reference is applied. For example, when control resource sets overlap in the time in a specific PDCCH monitoring section, if all control resource sets are connected to a UE-specific search space without being connected to a common search space, that is, if reference 1 is not satisfied, the UE may omit applying of reference 1 and apply reference 2.

When the control resource set is selected by the references, the UE may additionally consider two matters below for QCL information configured in the control resource set. Initially, when control resource set 1 has CSI-RS 1 as a reference signal having the relation of QCL-TypeD, a reference signal having the relation of QCL-TypeD with CSI-RS 1 is SSB1, and a reference signal having the relation of QCL-TypeD with control resource set 2 is SSB1, the UE may consider that two control resource sets 1 and 2 have different QCL-TypeD characteristics. Thereafter, when control resource set 1 has CSI-RS 1 configured in cell 1 as a reference signal having the relation of QCL-TypeD, a reference signal having the relation of QCL-TypeD with CSI-RS1 is SSB1, control resource set 2 has CSI-RS 2 configured in cell 2 as a reference signal having the relation of QCL-TypeD, and a reference signal having the relation of QCL-TypeD with CSI-RS 2 is SSB 1, the UE may consider that the two control resource sets have the same QCL-TypeD characteristic.

Figure 4:
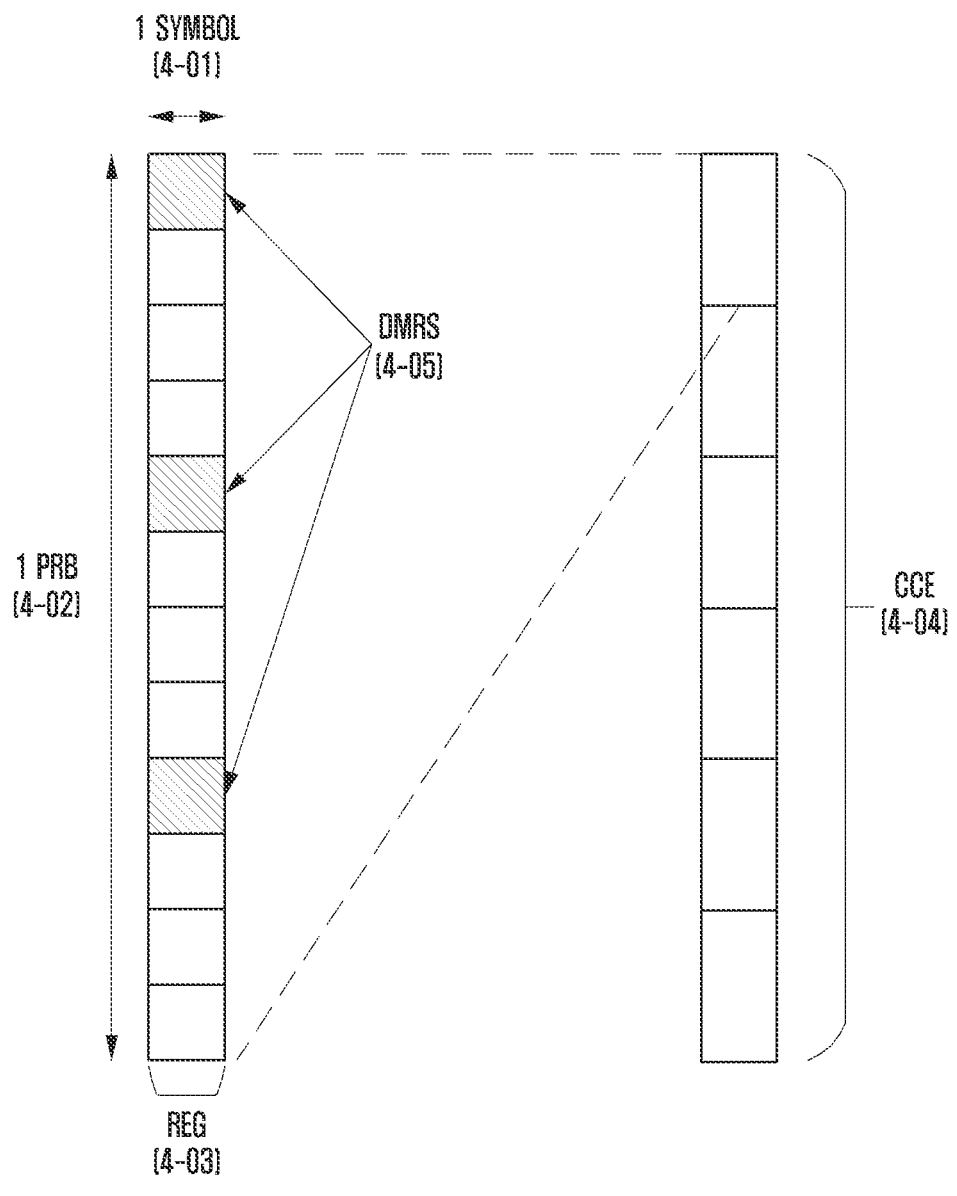
FIG. 4 illustrates a structure of a downlink control channel in a wireless communication system according to an embodiment of the disclosure.

FIG. 4 illustrates a structure of a downlink control channel in a wireless communication system according to an embodiment of the disclosure.

That is, FIG. 4 illustrates an example of a basic unit of time and frequency resources constituting a downlink control channel to be used in 5G according to an embodiment of the disclosure.

Referring to FIG. 4, a basic unit of time and frequency resources constituting a control channel may be defined as a resource element group (REG) 4-03. The REG 4-03 may be defined as 1 OFDM symbol 4-01 in the time domain and 1 physical resource block (PRB) 4-02 in the frequency domain, that is, 12 subcarriers. The base station may configure a downlink control channel allocation unit by concatenating the REGs 4-03.

Referring to FIG. 4, assuming that the basic unit in which the downlink control channel is allocated in 5G is a control channel element (CCE) 4-04, 1 CCE 4-04 may include a plurality of REGs 4-03. The REG 4-03 shown in FIG. 4 may include 12 REs, and if 1 CCE 4-04 includes 6 REGs 4-03, 1 CCE 4-04 may include 72 REs. When the downlink control resource set is configured, the corresponding area may include a plurality of CCEs 4-04, and a specific downlink control channel may be mapped to one or more CCEs 4-04 according to the aggregation level (AL) in the control resource set, and may then be transmitted. The CCEs 4-04 in the control resource set are identified by numbers, and the numbers of the CCEs 4-04 may be assigned according to a logical mapping method.

The basic unit of the downlink control channel shown in FIG. 4, that is, the REG 4-03, may include both the REs to which the DCI is mapped and an area to which the DMRS 4-05, which is a reference signal for decoding the same, is mapped. Referring to FIG. 4, three DMRSs 4-05 may be transmitted in 1 REG 4-03. In an embodiment, the number of CCEs required for transmitting the PDCCH may be 1, 2, 4, 8, or 16 depending on the aggregation level (AL), and the different numbers of CCEs may be used to implement link adaptation of the downlink control channel. For example, when AL=L, one downlink control channel may be transmitted through L CCEs.

The UE needs to detect a signal without being aware of information about the downlink control channel, and a search space indicating a set of CCEs may, for example, be defined for blind decoding. The search space is a set of downlink control channel candidates including CCEs that the UE must attempt to decode in a given aggregation level. Since there are various aggregation levels making one bundle of 1, 2, 4, 8, or 16 CCEs, the UE may have a plurality of search spaces. The search space set may be defined as a set of search spaces in all configured aggregation levels.

The search spaces may be classified into a common search space and a UE-specific search space. According to another embodiment, a specific group of UEs or all UEs may check a common search space of the PDCCH in order to receive cell-common control information such as dynamic scheduling for system information or a paging message.

The UE may receive PDSCH scheduling allocation information for transmission of an SIB including cell operator information and the like by examining the common search space of the PDCCH. In the case of the common search space, since a specific group of UEs or all UEs must receive the PDCCH, the common search space may be, for example, defined as a set of predetermined CCEs. Meanwhile, the UE may receive scheduling allocation information for a UE-specific PDSCH or PUSCH by checking the UE-specific search space of the PDCCH. The UE-specific search space may be UE-specifically defined as a function of the UE identity and various system parameters.

In 5G, the parameters of the search space for the PDCCH may be configured for the UE by the base station using higher layer signaling (e.g., SIB, MIB, or RRC signaling). In an example, the base station may configure the number of PDCCH candidates in each aggregation level L, monitoring periodicity for the search space, a monitoring occasion in units of symbols within the slot for the search space, a search space type (the common search space or the UE-specific search space), a combination of the DCI format and the RNTI to be monitored in the search space, the control resource set index for monitoring the search space, and the like for the UE. In another example, the above-described configuration may include information as shown in Table 8 below.

TABLE 8

SearchSpace ::=                SEQUENCE {
-- Identity of the search space. SearchSpaceId = 0 identifies the TABLE 8-continued

```
searchSpaceZero configured via PBCH (MIB) or ServingCellConfigCommon.
    searchSpaceId                   SearchSpaceId,
    controlResourceSetId                 ControlResourceSetId
    monitoringSlotPeriodicityAndOffset          CHOICE {
        sl1                 NULL,
        sl2                 INTEGER (0..1),
        sl4                 INTEGER (0..3),
        sl5                 INTEGER (0..4),
        sl8                 INTEGER (0..7),
        sl10                 INTEGER (0..9),
        sl16                 INTEGER (0..15),
        sl20                 INTEGER (0..19),
    }
    duration                 INTEGER (2..2559)
    monitoringSymbolsWithinSlot             BIT STRING (SIZE (14))
    nrofCandidates               SEQUENCE {
        aggregationLevel1             ENUMERATED {n0, n1, n2, n3, n4, n5,
n6, n8},
        aggregationLevel2             ENUMERATED {n0, n1, n2, n3, n4, n5,
n6, n8},
        aggregationLevel4             ENUMERATED {n0, n1, n2, n3, n4, n5,
n6, n8},
        aggregationLevel8             ENUMERATED {n0, n1, n2, n3, n4, n5,
n6, n8},
        aggregationLevel16             ENUMERATED {n0, n1, n2, n3, n4,
n5, n6, n8}
    }
    searchSpaceType                 CHOICE {
    -- Configures this search space as common search space (CSS) and DCI
formats to monitor.
        common                 SEQUENCE {
        },                 SEQUENCE {
        ue-Specific
            -- Indicates whether the UE monitors in this USS for DCI formats 0-0
and 1-0 or for formats 0-1 and 1-1.
            Formats                 ENUMERATED {formats0-0-And-1-0,
formats0-1-And-1-1},
            ...
    }
```

The base station may configure one or more search space sets for the UE, based on configuration information. According to another embodiment, the base station may configure search space set 1 and search space set 2 for the UE, may configure DCI format A scrambled by an X-RNTI in search space set 1 so as to be monitored in the common search space, and may configure DCI format B scrambled by a Y-RNTI in the search space set 2 so as to be monitored in the UE-specific search space.

According to configuration information, the common search space or the UE-specific search space may include one or a plurality of search space sets. Search space set #1 and search space set #2 may be configured as the common search space, and search space set #3 and search space set #4 may be configured as the UE-specific search space.

The common search space may be classified into a specific type of search space set according to the purpose thereof. The RNTI to be monitored may differ between the determined types of search space sets. The common search space types, the purposes, and the RNTIs to be monitored may be classified as shown in Table 9 below.

TABLE 9

| Search space type | Purposes | RNTI |
|---|---|---|
| Type0 CSS | PDCCH transmission for scheduling of SIB | SI-RNTI |
| Type0A CSS | PDCCH transmission for scheduling of SI other than SIB1 (SIB2 or the like) | SI-RNTI |

TABLE 9-continued

| Search space type | Purposes | RNTI |
|---|---|---|
| Type1 CSS | PDCCH transmission for scheduling of random access response (RAR), scheduling of Msg3 retransmission, and scheduling of Msg4 | RA-RNTI, TC-RNTI |
| Type2 CSS | Paging | P-RNTI |
| Type3 CSS | Transmission of group control information | INT-RNTI, SFI-RNTI, TPC-PUSCH-RNTI, TPC-PUCCH-RNTI, TPC-SRS-RNTI |
| | PDCCH transmission for scheduling of data for PCell | C-RNTI, MCS-C-RNTI, CS-RNTI |

Meanwhile, the following combinations of DCI formats and RNTIs may be monitored in the common search space. The disclosure is not limited to the following examples.

DCI format 0_0/1_0 with CRC scrambled by C-RNTI, CS-RNTI, SP-CSI-RNTI, RA-RNTI, TC-RNTI, P-RNTI, and SI-RNTI
   DCI format 2_0 with CRC scrambled by SFI-RNTI
   DCI format 2_1 with CRC scrambled by INT-RNTI
   DCI format 2_2 with CRC scrambled by TPC-PUSCH-RNTI and TPC-PUCCH-RNTI
   DCI format 2_3 with CRC scrambled by TPC-SRS-RNTI In the UE-specific search space, the following combinations of DCI formats and RNTIs may be monitored. The disclosure is not limited to the following examples.

DCI format 0_0/1_0 with CRC scrambled by C-RNTI, CS-RNTI, and TC-RNTI

DCI format 1_0/1_1 with CRC scrambled by C-RNTI, CS-RNTI, and TC-RNTI

The specified RNTIs may follow the definitions and usages as follows.

Cell RNTI (C-RNTI) for scheduling of UE-specific PDSCH

Temporary cell RNTI (TC-RNTI) for scheduling of UE-specific PDSCH

Configured scheduling RNTI (CS-RNTI) for scheduling of semi-statically configured UE-specific PDSCH Random access RNTI (RA-RNTI) for scheduling of PDSCH in random access stage Paging RNTI (P-RNTI) for scheduling of PDSCH in which paging is transmitted System information RNTI (SI-RNTI) for scheduling of PDSCH in which system information is transmitted Interruption RNTI (INT-RNTI) for informing of puncturing on PDSCH Transmit power control for PUSCH RNTI (TPC-PUSCH-RNTI) for indicating power control command for PUSCH Transmit power control for PUCCH RNTI (TPC-PUCCH-RNTI) for indicating power control command for PUCCH Transmit power control for SRS RNTI (TPC-SRS-RNTI) for indicating power control command for SRS In an embodiment, the above-described DCI formats may be defined as shown in Table 10 below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

A plurality of search space sets may be configured using different parameters (e.g., the parameters in Table 8) in 5G. As such, a set of search space sets monitored by the UE may differ at each time. For example, in case that search space set #1 is configured as the X-slot periodicity, if search space set #2 is configured as the Y-slot periodicity, and if X and Y are different, the UE may monitor both search space set #1 and search space set #2 in a specific slot, and may monitor one of search space set #1 and search space set #2 in a specific slot.

If a plurality of search space sets is configured for the UE, the following conditions may be considered in order to determine the search space set to be monitored by the UE. (Condition 1: Limit Maximum Number of PDCCH Candidates)

The number of PDCCH candidates capable of being monitored per slot may not exceed $M^\mu$. $M^\mu$ may be defined as the maximum number of PDCCH candidates per slot in the cell in which the subcarrier spacing is configured to be $15 \cdot 2^\mu$ kHz, and may be defined as shown in Table 11 below.

TABLE 11

| μ | Maximum number of PDCCH candidates per slot and per serving cell ($M^\mu$) |
|---|---|
| 0 | 44 |
| 1 | 36 |
| 2 | 22 |
| 3 | 20 |

(Condition 2: Limit Maximum Number of CCEs)

The number of CCEs constituting the entire search space per slot (the entire search space may indicate a set of all CCEs corresponding to the union area of a plurality of search space sets) may not exceed $C^\mu$. $C^\mu$ may be defined as the maximum number of CCEs per slot in the cell in which the subcarrier spacing is configured to be $15 \cdot 2^\mu$ kHz, and may be defined as shown in Table 12 below.

TABLE 12

| μ | Maximum number of CCEs per slot and per serving cell ($C^\mu$) |
|---|---|
| 0 | 56 |
| 1 | 56 |
| 2 | 48 |
| 3 | 32 |

For convenience of explanation, the situation in which both condition 1 and condition 2 are satisfied at a specific time may be defined as "condition A." The case in which condition A is not satisfied may indicate the case in which at least one of condition 1 and condition 2 described above is not satisfied.

Condition A may not be satisfied at a specific time depending on the configurations of the search space sets of the base station. If condition A is not satisfied at a specific time, the UE may select and monitor only some of the search space sets configured to satisfy condition A at the corresponding time, and the base station may transmit a PDCCH to the selected search space set.

Selection of some search spaces from among the overall configured search space sets may be performed according to the following methods.

Method 1

In case that condition A for the PDCCH is not satisfied at a specific time (slot), a UE (or a base station) may preferentially select the search space set in which the search space type is configured as a common search space from among the search space sets existing at the corresponding time, instead of the search space set in which the search space type is configured as a UE-specific search space.

For example, in case that all search space sets configured as the common search space are selected (i.e., if condition A is satisfied even after selecting all search spaces configured as the common search space), the UE (or the base station) may select the search space sets configured as the UE-specific search space. For another example, in case that there are a plurality of search space sets configured as the UE-specific search space, the search space set having a lower search space set index may have a higher priority. The UE or the base station may select the UE-specific search space sets within a range in which condition A is satisfied in consideration of priority.

Hereinafter, methods for allocating time and frequency resources for transmission of data in NR will be described.

The NR system may provide detailed frequency domain resource allocation (FD-RA) methods as follows, in addition to frequency domain resource candidate allocation through BWP indication.

Figure 5:
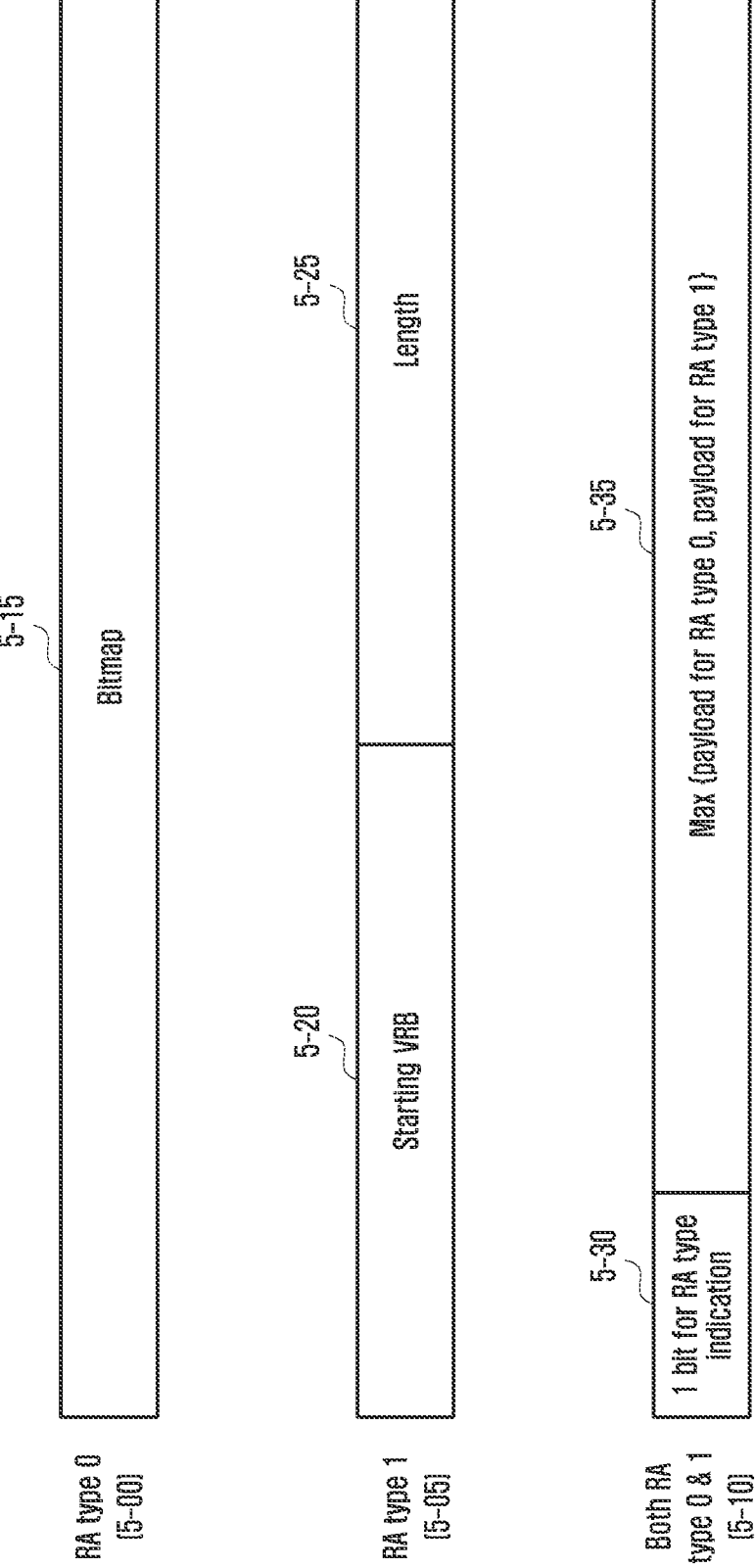
FIG. 5 illustrates a structure of a downlink control channel in a wireless communication system according to an embodiment of the disclosure.

FIG. 5 illustrates an example of allocating frequency-domain resources of a physical downlink shared channel (PDSCH) in a wireless communication system according to an embodiment of the disclosure.

FIG. 5 illustrates three frequency domain resource allocation methods of type 0 (5-00), type 1(5-05), and dynamic switch 5-10, which may be configured through a higher layer in NR.

Referring to FIG. 5, in case that a UE is configured to use only resource type 0 through higher layer signaling (indicated by reference numeral 5-00), some downlink control information (DCI) for allocating a PDSCH to the UE has a bitmap of NRBG bits. The conditions for this will be described later. The NRBG indicates the number of resource block groups (RBGs) determined, as shown in Table 13 below, according to the size of a BWP allocated by a BWP indicator and the higher layer parameter "rbg-Size", and data is transmitted in the RBG represented as "1" using a bitmap.

TABLE 13

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In case that the UE is configured to use only resource type 1 through higher layer signaling (indicated by reference numeral 5-05), some DCI for allocating PDSCHs to the UE has frequency domain resource allocation information including $$\lceil \log_2(N_{RB}^{DL,BWP}(N_{RB}^{DL,BWP} + 1)/2) \rceil \text{ bits.}$$

The conditions for this will be described again later. The base station may configure starting VRB 5-20 and the length 5-25 of the frequency domain resource subsequently allocated therefrom.

If the UE is configured to use both resource type 0 and resource type 1 through higher layer signaling (indicated by reference numeral 5-10), some DCI for allocating the PDSCHs to the corresponding UE has frequency domain resource allocation information including bits of a large value 5-35 among the payload 5-15 for configuring resource type 0 and the payloads 5-20 and 5-25 for configuring resource type 1. The conditions for this will be described again later. One bit 5-30 may be added to the foremost part (MSB) of the frequency domain resource allocation information in the DCI, and bit 0 indicates that resource type 0 is to be used, and bit 1 indicates that resource type 1 is to be used.

Hereinafter, a time domain resource allocation method for a data channel in the next-generation mobile communication system (the 5G or NR system) will be described.

In an embodiment, the base station may configure a table about time domain resource allocation information for a downlink data channel (physical downlink shared channel (PDSCH)) and an uplink data channel (physical uplink shared channel (PUSCH)) for the UE through higher layer signaling (e.g., RRC signaling). A table including up to maxNrofDL-Allocations=16 entries may be configured for the PDSCH, and a table including up to maxNrofUL-Allocations=16 entries may be configured for the PUSCH. In an embodiment, the time domain resource allocation information may include PDCCH-to-PDSCH slot timing (corresponding to the time interval in units of slots between the time at which the PDCCH is received and the time at which the PDSCH scheduled by the received PDCCH is transmitted, which is denoted as K0), PDCCH-to-PUSCH slot timing (corresponding to the time interval in units of slots between the time at which the PDCCH is received and the time at which the PUSCH scheduled by the received PDCCH is transmitted, which is denoted as K2), information on the location and length of a start symbol in which the PDSCH or PUSCH is scheduled in the slot, a mapping type of the PDSCH or PUSCH, and the like. For example, the base station may notify the UE of the information shown in Table 14 or Table 15 below.

TABLE 14

```
PDSCH-TimeDomainResourceAllocationList ::= SEQUENCE
(SIZE(1..maxNrofDL-Allocations)) OF PDSCH-
TimeDomainResourceAllocation
PDSCH-TimeDomainResourceAllocation ::= SEQUENCE {
    k0                    INTEGER(0..32)
OPTIONAL, -- Need S
    mappingType           ENUMERATED {typeA, typeB},
    startSymbolAndLength   INTEGER (0..127)
}
```

TABLE 15

```
PUSCH-TimeDomainResourceAllocationList ::= SEQUENCE
(SIZE(1..maxNrofUL-Allocations)) OF PUSCH-
TimeDomainResourceAllocation
PUSCH-TimeDomainResourceAllocation ::= SEQUENCE {
    k2                    INTEGER(0..32)   OPTIONAL, -- Need S
    mappingType           ENUMERATED {typeA, typeB},
    startSymbolAndLength   INTEGER (0..127)
}
```

The base station may, for example, notify the UE of one of the entries in the table for the time domain resource allocation information described above through L1 signaling (e.g., DCI) (for example, it may be indicated by a field "time domain resource allocation" in DCI). The UE may obtain time domain resource allocation information for the PDSCH or the PUSCH, based on the DCI received from the base station.

Figure 6:
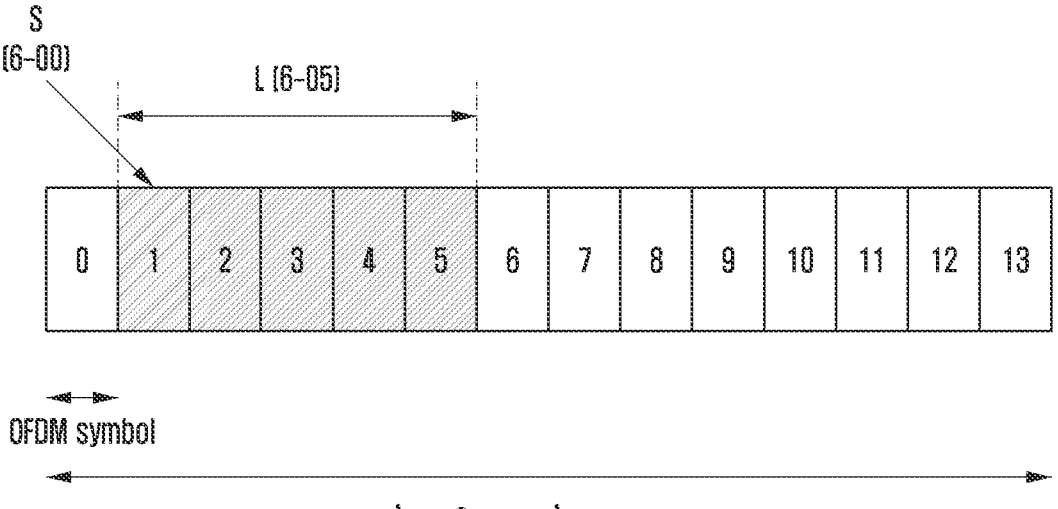
FIG. 6 illustrates an example of allocating time domain resources of a physical downlink shared channel (PDSCH) in a wireless communication system according to an embodiment of the disclosure.

FIG. 6 illustrates an example of allocating time domain resources of a PDSCH in a wireless communication system according to an embodiment of the disclosure.

Referring to FIG. 6, a base station may indicate the time domain location of a PDSCH resource according to the subcarrier spacing (SCS) ($\mu_{PDSCB}$, $\mu_{PDCCH}$) of a data channel and a control channel configured using a higher layer, a scheduling offset value (K0), a starting location 6-00 of OFDM symbols within one slot 6-10 dynamically indicated through DCI, and the length 6-05 thereof.

Figure 7:
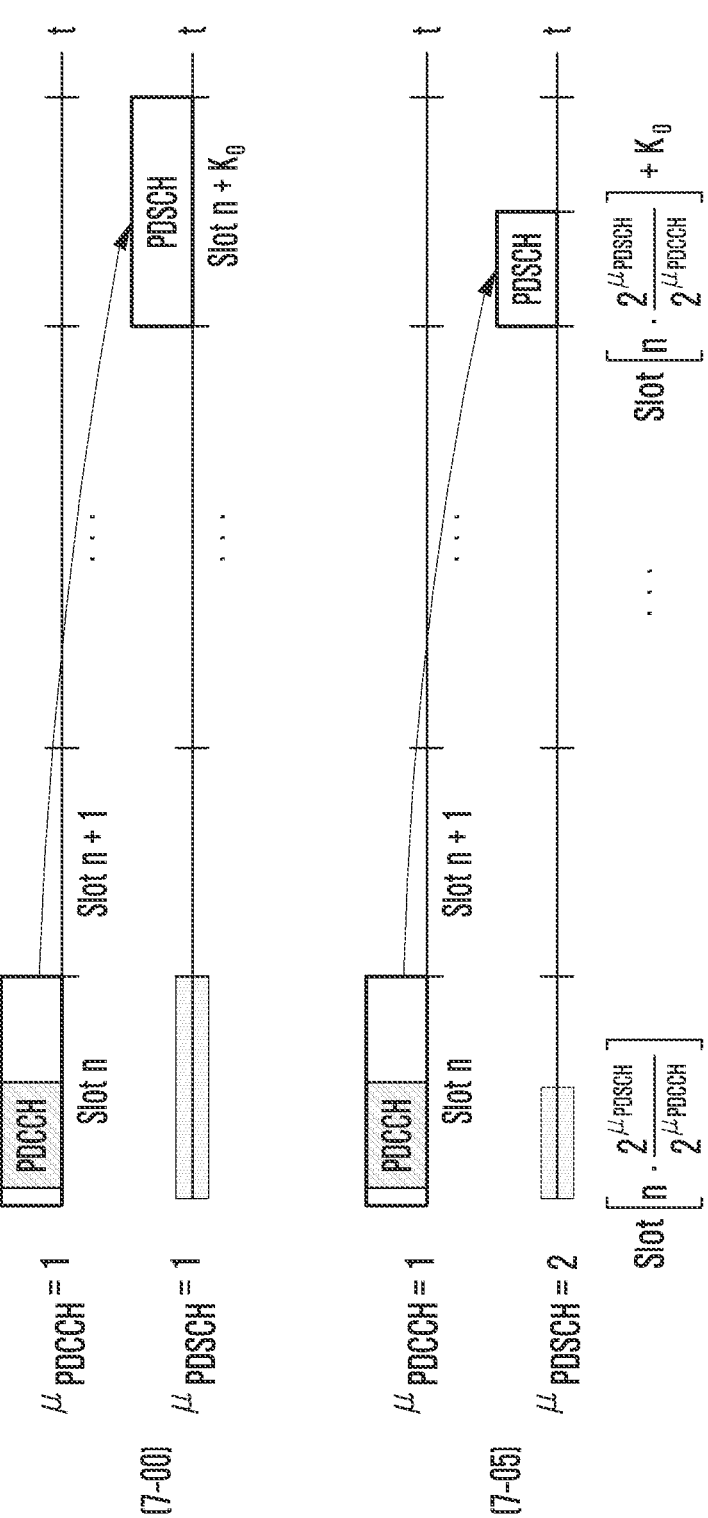
FIG. 7 illustrates an example of allocating time domain resources of a PDSCH in a wireless communication system according to an embodiment of the disclosure.

FIG. 7 illustrates an example of allocating time domain resources according to subcarrier spacing of a data channel and a control channel in a wireless communication system according to an embodiment of the disclosure.

Referring to FIG. 7, when a subcarrier spacing of the data channel is the same as the subcarrier spacing of the control channel ($\mu_{PDSCH}=\mu_{PDCCH}$) (7-00), the slot numbers for the data and the control are the same. Accordingly, the base station and the UE may recognize the occurrence of a scheduling offset according to a predetermined slot offset (K0). When the subcarrier spacing of the data channel is different from the subcarrier spacing of the control channel ($\mu_{PDSCH}{\neq}\mu_{PDCCH}$) (7-05), the slot numbers for the data and the control are different from each other. Accordingly, the base station and the UE may recognize the occurrence of a scheduling offset according to a predetermined slot offset (K0), based on the subcarrier spacing of the PDCCH.

QCL, TCI State

In the wireless communication system, one or more different antenna ports (or replaced with one or more channels, signals, and combinations thereof, but commonly referred to as different antenna ports for convenience in the following description of the disclosure) may be associated by a quasi-co-location (QCL) configuration shown in Table 16 below. In an example, the TCI state is to inform of a QCL relation between a PDCCH (or a PDCCH DMRS) and another RS or channel, and a reference antenna port A (reference RS #A) and another purpose antenna port B (target RS #B) which are quasi co-located (QCLed) means that the UE is allowed to apply some or all of large-scale channel parameters estimated in the antenna port A to channel measurement from the antenna port B. In another example, the QCL is required to associate different parameters according to conditions, such as 1) time tracking influenced by average delay and delay spread, 2) frequency tracking influenced by Doppler shift and Doppler spread, 3) radio resource management (RRM) influenced by an average gain, and 4) beam management (BM) influenced by a spatial parameter. Accordingly, NR supports four types of QCL relations shown in Table 16 below.

TABLE 16

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may refer to some or all of various parameters, such as angle of arrival (AoA), power angular spectrum (PAS) of AoA, angle of departure (AoD), PAS of AoD, transmit/receive channel correlation, transmit/receive beamforming, spatial channel correlation, and the like.

The QCL relation may be configured in the UE through RRC parameter TCI-state and QCL-Info as shown in Table 17 below. Referring to Table 17 below, the base station may configure one or more TCI states in the UE and inform the UE of a maximum of two QCL relations (qcl-Type 1 and qcl-Type 2) for an RS referring to IDs of the TCI states, that is, a target RS. At this time, each piece of the QCL information (QCL-Info) included in the TCI state includes a serving cell index and a BWP index of a reference RS indicated by the corresponding QCL information, a type and an ID of the reference RS, and the QCL type as shown in Table 16 above.

TABLE 17

```
TCI-State ::=                SEQUENCE {
  tci-StateId                TCI-StateId,
  (ID of corresponding TCI state)
  qcl-Type1                  QCL-Info,
  (QCL information of first reference RS of RS (target RS) referring to
corresponding TCI sate ID)
```

TABLE 17-continued

```
  qcl-Type2                  QCL-Info  OPTIONAL, -- Need R
  (QCL information of second reference RS of RS (target RS) referring to
corresponding TCI sate ID)
  ...
}
QCL-Info ::=                 SEQUENCE {
  cell                       ServCellIndex    OPTIONAL, -- Need R
  (Serving cell index of reference RS indicated by corresponding QCL
information)
  bwp-Id                     BWP-Id           OPTIONAL, --
Cond CSI-RS-Indicated
  (BWP index of reference RS indicated by corresponding QCL
information)
  referenceSignal            CHOICE {
    csi-rs                   NZP-CSI-RS-ResourceId,
    ssb                      SSB-Index
  (One of CSI-RS and SSB ID indicated by corresponding QCL
information)
  },
  qcl-Type                   ENUMERATED {typeA, typeB, typeC,
typeD},
  ...
}
```

Method and Apparatus for HARQ-ACK Feedback Transmission

In another embodiment, the NR system employs a hybrid automatic repeat request (HARQ) scheme for, when a decoding failure has occurred in an initial transmission, retransmitting corresponding data in a physical layer. The HARQ scheme means that if a receiver fails to correctly decode data, the receiver transmits information (negative acknowledgement; NACK) notifying of a decoding failure to a transmitter, so as to allow the transmitter to retransmit corresponding data in a physical layer. The receiver combines the data retransmitted by the transmitter with the data previously failed to be decoded, to improve data reception performance. Additionally, when the receiver correctly decodes data, the receiver may transmit information (acknowledgement, ACK) notifying of a decoding success to the transmitter, so as to allow the transmitter to transmit new data.

Hereinafter, the disclosure describes a method and apparatus for transmitting HARQ-ACK feedback for downlink data transmission. Specifically, a method for configuring HARQ-ACK feedback bits when a UE is to transmit multiple HARQ-ACKs within a slot through an uplink is described.

In a wireless communication system, particularly a new radio (NR) system, a base station may configure one component carrier (CC) or multiple CCs for downlink transmission to a UE. In each CC, downlink transmission and uplink transmission slots and symbols may be configured. When a physical downlink shared channel (PDSCH), which is downlink data, is scheduled, at least one of slot timing information for PDSCH mapping, position information on a start symbol for PDSCH mapping in the corresponding slot, and information on the number of symbols mapped by the PDSCH may be transmitted through a specific bit field of downlink control information (DCI). For example, when the DCI scheduling the PDSCH is transmitted in slot n, and if K0 which is slot timing information for PDSCH transmission indicates 0, a start symbol position is 0, and a symbol length is 7, the corresponding PDSCH is mapped to seven symbols from the symbol 0 in the slot n and transmitted. After K1 slot from transmission of PDSCH which is a downlink data signal, the HARQ-ACK feedback is transmitted from the UE to the base station. K1 information which is timing information for HARQ-ACK transmission may be transmitted through the DCI, a candidate set of possible K1 values may be delivered via higher signaling, and the DCI may indicate one of them.

When the UE is configured with a semi-static HARQ-ACK codebook, the UE may determine the feedback bit (or HARQ-ACK codebook size) to be transmitted, based on a table including slot information K0, start symbol information, the number of symbols, and length information, in relation to PDSCH mapping, and based on K1 candidate values which are HARQ-ACK feedback timing information for PDSCH. The table including slot information, start symbol information, the number of symbols, and length information, in relation to PDSCH mapping, may, for example, have default values or may be configured in the UE by the base station.

In case that the UE is configured with a dynamic HARQ-ACK codebook, the UE may determine the HARQ-ACK feedback bit (or HARQ-ACK codebook size) to be transmitted by the UE, based on downlink assignment indicator (DAI) information included in the DCI in a slot for transmission of HARQ-ACK information determined according to slot information K0 for PDSCH mapping and HARQ-ACK feedback timing information K1 value for PDSCH.

Figure 8:
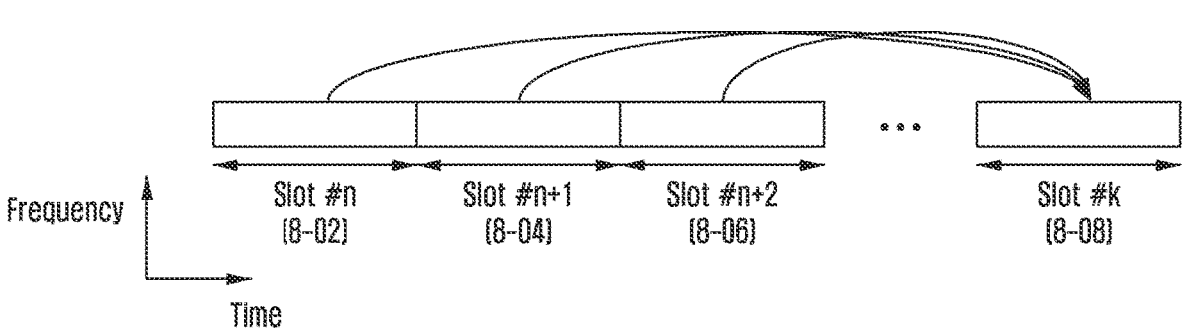
FIG. 8 illustrates a method for configuring a semi-static HARQ-ACK codebook in an NR system according to an embodiment of the disclosure.

FIG. 8 illustrates a method for configuring a semi-static HARQ-ACK codebook in an NR system according to an embodiment of the disclosure.

In a situation where the number of HARQ-ACK PUCCHs which a UE may transmit in one slot is limited to one, when a higher layer signal configuring a semi-static HARQ-ACK codebook is received by the UE, the UE may receive a PDSCH in an HARQ-ACK codebook in a slot indicated by the value of a PDSCH-to-HARQ feedback timing indicator in a DCI format 1_0 or a DCI format 1_1, or may report HARQ-ACK information for SPS PDSCH release in the slot. The UE reports an HARQ-ACK information bit value, as a NACK, in an HARQ-ACK codebook in a slot that is not indicated by a PDSCH-to-HARQ feedback timing indicator field in a DCI format 1_0 or a DCI format 1_1. When the UE reports only HARQ-ACK information for one SPS PDSCH release or one PDSCH reception in MA,c cases for candidate PDSCH reception, and the report is scheduled by a DCI format 1_0 including information indicating that a counter DCI field is 1 in a PCell, the UE may determine one HARQ-ACK codebook for the SPS PDSCH release or the PDSCH reception.

Other than the above case, an HARQ-ACK codebook determination method according to the below methods may be employed.

When a set of PDSCH reception candidate occasions in serving cell c is MA,c, MA,c may be obtained through the (pseudo-code 1) stages below.

(Pseudo-Code 1 Start)
    stage 1: initializing j to 0, and initializing MA,c to an empty set. Initializing k, which is an HARQ-ACK transmission timing index, to 0.
    stage 2: configuring R as a set of rows of a table including information of a slot to which a PDSCH is mapped, starting symbol information, and information of the number or length of symbols. When a PDSCH-available mapping symbol indicated by a value of R is configured to a UL symbol according to DL and UL configurations configured through higher signaling, removing a corresponding row from R.
    stage 3-1: receiving, by a UE, one unicast PDSCH in one slot, and when R is not an empty set, adding one PDSCH to set MA,c.

stage 3-2: if the UE is able to receive two or more unicast PDSCHs in one slot, counting the number of PDSCHs allocatable in different symbols from the calculated R, and adding the counted number of PDSCHs to MA,c.
    stage 4: increasing k by one and restarting from stage 2.
(Pseudo-Code 1 End)

In pseudo-code 1, as illustrated in FIG. 8, in order to transmit an HARQ-ACK PUCCH in slot #k 8-08, all slot candidates in which a PDSCH-to-HARQ-ACK timing which can indicate slot #k 8-08 is possible are considered. Referring to FIG. 8, it is assumed that HARQ-ACK transmission is possible in slot #k 8-08 by a combination of PDSCH-to-HARQ-ACK timings that are possible by only PDSCHs scheduled in slot #n 8-02, slot #(n+1) 8-04, and slot #(n+2) 8-06. By considering time domain resource configuration information of a PDSCH which may be scheduled in each of the slots 8-02, 8-04, and 8-06, and information indicating whether a symbol in a slot corresponds to the uplink or the downlink, the number of PDSCHs which can be maximally scheduled for each slot is derived. In an example, when two PDSCHs can be maximally scheduled in the slot 8-02, three PDSCHs can be maximally scheduled in the slot 8-04, and two PDSCHs can be maximally scheduled in the slot 8-06, the maximum number of PDSCHs included in an HARQ-ACK codebook transmitted in the slot 8-08 is 7. This is called the cardinality of an HARQ-ACK codebook.

Figure 9:
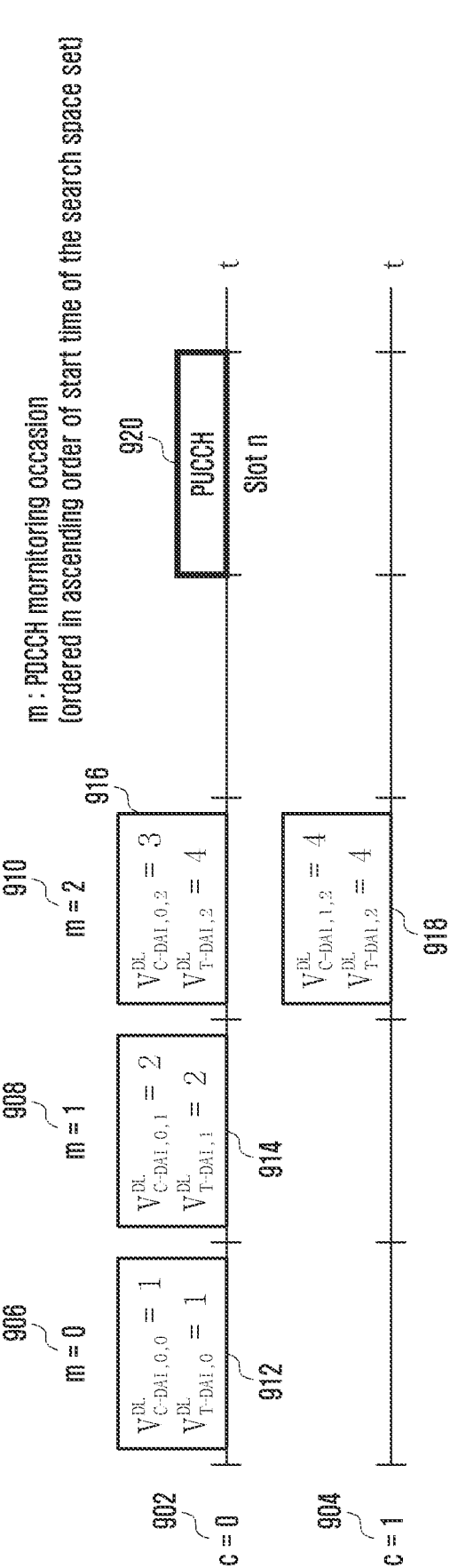
FIG. 9 illustrates a method for configuring a dynamic HARQ-ACK codebook in the NR system according to an embodiment of the disclosure.

FIG. 9 illustrates a method for configuring a dynamic HARQ-ACK codebook in an NR system according to an embodiment of the disclosure.

In an embodiment, a UE may transmit HARQ-ACK information transmitted in one PUCCH in slot n, based on a PDSCH-to-HARQ feedback timing value for PUCCH transmission of HARQ-ACK information for PDSCH reception or SPS PDSCH release, and a K0 that is transmission slot position information of a PDSCH scheduled by a DCI format 1_0 or 1_1.

For the above HARQ-ACK information transmission, the UE may determine an HARQ-ACK codebook of a PUCCH transmitted in a slot determined by a PDSCH-to-HARQ feedback timing and K0, based on a DAI included in DCI indicating a PDSCH or SPS PDSCH release.

The DAI is configured by a counter DAI (cCounter DAI) and a total DAI (tTotal DAI). The counter DAI is information indicating the position of HARQ-ACK information in a HARQ-ACK codebook, which corresponds to a PDSCH scheduled by a DCI format 1_0 or a DCI format 1_1. A counter DAI value in a DCI format 1_0 or 1_1 indicates the accumulative value of PDSCH receptions or SPS PDSCH releases scheduled by the DCI format 1_0 or 11 in particular cell c. The above accumulative value is configured based on a PDCCH monitoring occasion in which the scheduled DCI exists and a serving cell.

The total DAI is a value indicating the size of an HARQ-ACK codebook. A total DAI value implies the total number of PDSCHs or SPS PDSCH releases which are scheduled at and before the time point at which DCI is scheduled. A total DAI is a parameter used in a case where, in a carrier aggregation (CA) situation, HARQ-ACK information in serving cell c also includes HARQ-ACK information for a PDSCH scheduled in another cell as well as serving cell c. There is no total DAI parameter in a system operated by one cell.

FIG. 9 illustrates an example of a UE operation relating to the DAI in case that the dynamic HARQ-ACK codebook is used. FIG. 9 shows that, in a case in which two carriers (c) are configured for a UE, when the UE transmits an HARQ-ACK codebook selected based on a DAI, through a PUCCH 920 in an n-th slot of carrier 0 902, the values of a counter DAI (C-DAI) and a total DAI (T-DAI) indicated by DCI discovered in each PDCCH monitoring occasion configured for each of the carriers are changed. First, in DCI discovered in an occasion 906 indicated by m=0, each of the C-DAI and the T-DAI indicates 1 (as indicated by reference numeral 912). In DCI discovered in an occasion 908 indicated by m=1, each of the C-DAI and the T-DAI indicates 2 (as indicated by reference numeral 914). In DCI discovered in an occasion 910 indicated by m=2 in carrier 0 (c=0, 902), the C-DAI indicates 3 (as indicated by reference numeral 916). In DCI discovered in an occasion 910 indicated by m=2 in carrier 1 (c=1, 904), the C-DAI indicates 4 (as indicated by reference numeral 918). If carriers 0 and 1 are scheduled in the same monitoring occasion, all the T-DAIs are indicated by 4.

Referring to FIGS. 8 and 9, a determination of an HARQ-ACK codebook is operated in a situation where only one PUCCH containing HARQ-ACK information is transmitted in one slot. As an example of a method in which one PUCCH transmission resource is determined in one slot, when PDSCHs scheduled in different pieces of DCI are multiplexed into one HARQ-ACK codebook in the same slot, and the codebook is transmitted, a PUCCH resource selected for HARQ-ACK transmission is determined to be a PUCCH resource indicated by a PUCCH resource field indicated in DCI lastly scheduling a PDSCH. A PUCCH resource indicated by a PUCCH resource field indicated in DCI scheduled before the DCI is neglected.

Network-Controlled Repeater

Coverage is a very important factor in wireless communication systems. Currently, 5G is being commercialized, and millimeter wave is also being commercialized, but there is not much actual use due to limited coverage. Many operators are looking for methods to provide reliable coverage while being economical at the same time. Installing multiple base stations may also be considered, but in this case, due to high cost, a more economical method has been sought.

Accordingly, the first technology considered is an integrated access and backhaul (IAB), which has been studied from Rel-16 to Rel-17. IAB is a kind of relay that does not require a backhaul network connected by wire, and relays between a base station and a terminal. Although IABs have similar performance to base stations, cost-increasing is a problem. A traditional RF repeater may be secondly considered. An RF repeater is the most basic unit of repeater that amplifies and transmits received signals. The RF repeater has the advantage of being inexpensive because the RF repeater simply amplifies and transmits the received signal, but cannot actively cope with various situations. For example, the RF repeater generally uses an omni-antenna instead of using a directional antenna, thereby not obtaining a beamforming gain. Additionally, the RF repeater is a source of interference because it amplifies and transmits noise even when there is no terminal connected to the RF repeater. IABs and RF repeaters have distinct advantages and disadvantages because they are biased between performance and cost. In order to increase coverage, not only performance but also cost should be taken into consideration, which leads to the need for new terminals or amplifiers.

In 3GPP Rel-18, studies are working on a network-controlled repeater (NCR) that retains the simple amplification and transmission operation of an RF repeater, but maximizes coverage gains by enabling beamforming techniques using adaptive antennas. In order for the NCR to transmit signals to terminals using adaptive antennas in a cell, the NCR should be able to receive control signals from a base station. Therefore, the NCR should be able to detect and decode control signals of the base station, and may have a similar transmission and reception structure for control signals as that of the terminal. The NCR may basically amplify signals transmitted by the base station and transmit the amplified signals to the terminal, and amplify signals transmitted by the terminal and transmit the amplified signals to the base station. The NCR may simply amplify and transmit signals or channels transmitted and received by the base station and the terminal without detecting or decoding the signals or channels. As such, the terminal is unable to know whether the NCR is involved in communication between the base station and the terminal. From the viewpoint of the terminal, it is not possible to distinguish between a base station and an NCR, and the NCR may be seen as the base station. Terminals do not require any additional information or operations for the NCR, and thus a terminal of any release may support the NCR.

From the viewpoint of a base station, the NCR may be seen as a normal terminal. When the NCR is first installed, the NCR may perform an initial access to the base station like a normal terminal, and after a higher layer connection (e.g., RRC connection) is established, the NCR may receive, from the base station, a configuration that a normal terminal is able to receive from the base station. After establishing a connection with the base station, the NCR may perform an operation of amplifying and transmitting signals. From the viewpoint of the base station, it is necessary to know whether the terminal is connected to the base station directly or through the NCR. When a terminal is located within the coverage of the NCR, the terminal may communicate with a base station through the NCR, and the base station may recognize the same through implementation.

From the viewpoint of the NCR, regardless of whether a terminal is located in the coverage of the NCR or not, the NCR may perform an operation of amplifying the signal and transmitting the amplified signal to the terminal under the control of the base station. The base station knows which terminal is communicating through which NCR, but the NCR is unable to know the same. The base station may also use a control signal that plays a similar role as that of DCI in order to control the NCR. In the disclosure, this control signal will be defined as side control information (SCI) for convenience. The SCI is not limited to terms used later in the disclosure, and other terms with equivalent technical meaning may be used, such as repeater-DCI (R-DCI), repeater control information (RCI), network-controlled repeater control information (NCI), and the like. The SCI refers to a control channel transmitted by the base station in order to control the NCR, and this signal is unable to be known by the terminal and is only recognizable by the base station and the NCR.

Figure 10:
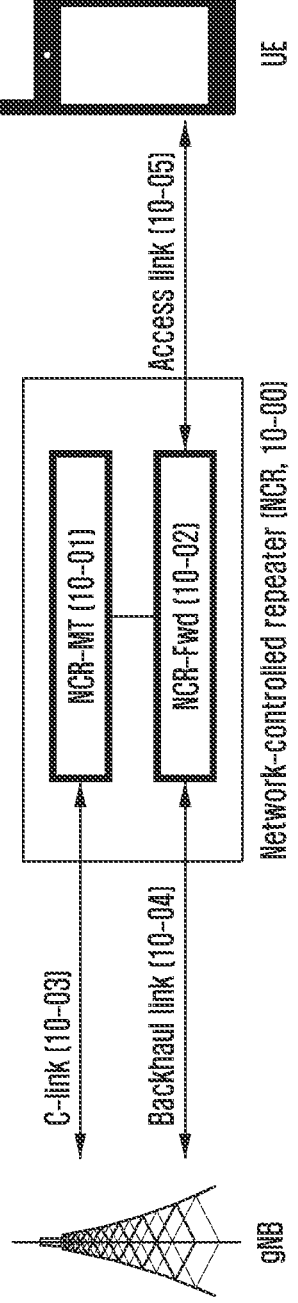
FIG. 10 illustrates an example of transmission and reception associated with an NCR when the NCR performs relaying between a base station and a UE according to an embodiment of the disclosure.

FIG. 10 illustrates an example of transmission and reception associated with an NCR when the NCR performs relaying between a base station and a UE according to an embodiment of the disclosure.

Referring to FIG. 10, an operation of an NCR 10-00 relaying communications (e.g., downlink, uplink) between a base station and a UE is shown. The NCR requires a structure capable of transmitting and receiving control signaling of the base station, which may be performed by a network-controlled repeater-mobile termination (NCR-MT) 10-01. The NCR-MT may receive control signaling from the base station via a control link (C-link) 10-03, and may send feedback to the base station. From the viewpoint of the base station, the NCR-MT looks like a normal UE and communication according thereto may be performed. The base station may, for example, control network-controlled repeater-forwarding (NCR-Fwd) 10-02 by transmitting control signaling to the NCR-MT. The NCR-Fwd may be configured by only basic RF or physical layers, and may perform an operation of amplifying the signal and forwarding the amplified signal to the UE. In the case of downlink, the NCR-Fwd may receive signals from the base station through a backhaul link 10-04 and then forward the received signals to the UE through an access link 10-05. Since the backhaul link and the C-link are not necessarily physically separated links, the NCR may perform amplification and forwarding, and simultaneously detect SCI, which is established by the base station to indicate an operation of the NCR, on the C-link. In the case of uplink, the NCR may receive the uplink signal transmitted by the UE through the access link 10-05 and perform an operation of amplifying and forwarding the uplink signal to the base station through the backhaul link 10-04. At this time, the NCR may transmit SRS or uplink feedback for the SCI or higher layer control to the base station. Assuming that the NCR-MT part of the NCR is the same as that of a general terminal, it would be a reasonable assumption that the NCR transmits uplink feedback on its own.

In the downlink, the NCR may detect and receive SCI from the base station and simultaneously amplify the downlink signal and forward the amplified signal to the UE. This operation may be possible in case that the NCR is able to perform the amplification and forwarding operations while simultaneously discovering the SCI. Since SCI discovery requires low complexity, the NCR may perform SCI discovery operation at no additional cost. In the uplink, the operation of the NCR transmitting uplink feedback on its own while simultaneously amplifying and forwarding the uplink signal of the UE may vary depending on the implementation of the NCR.

Figure 11:
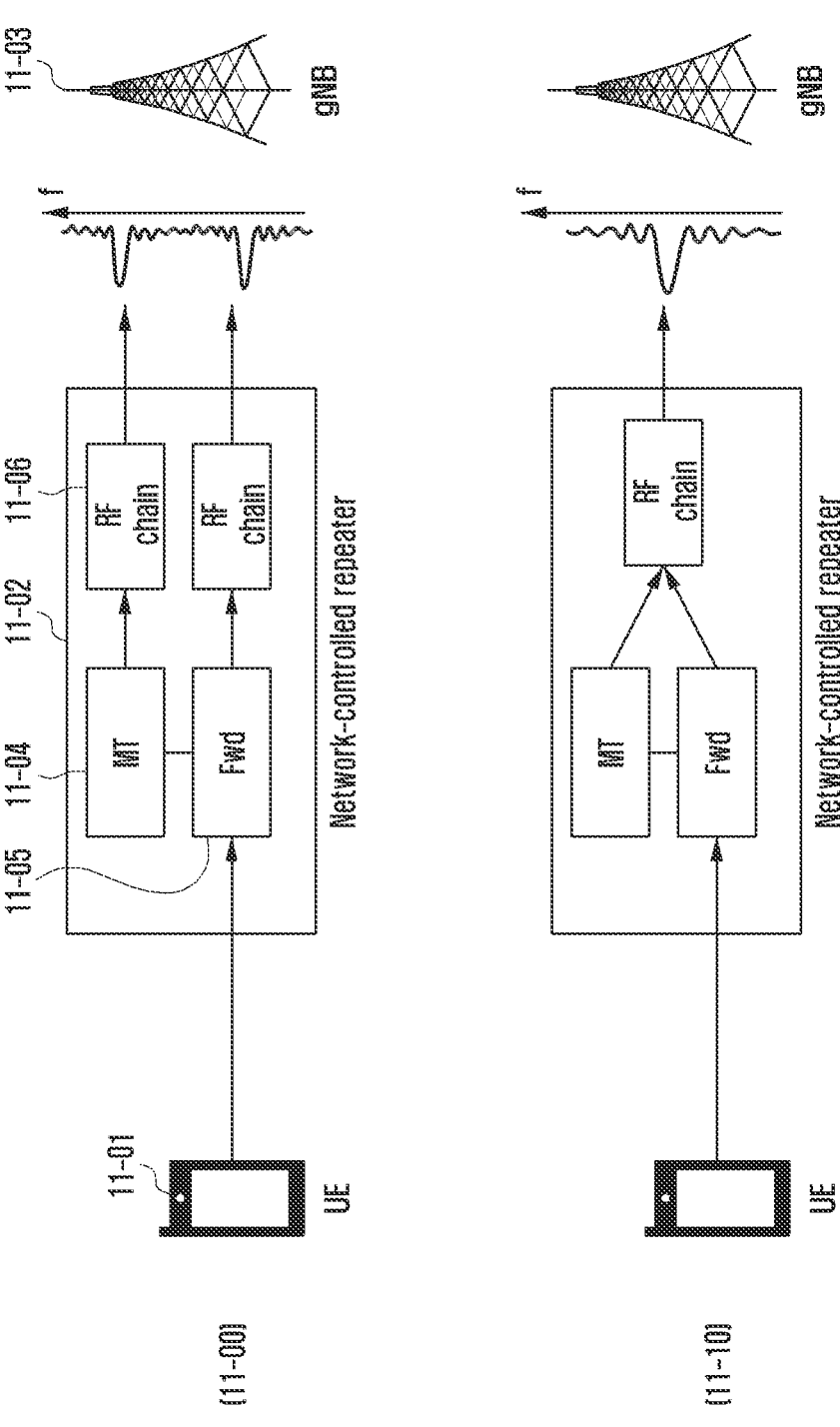
FIG. 11 illustrates an example of an uplink transmission according to an RF chain when an NCR performs relaying between a base station and a UE according to an embodiment of the disclosure.

FIG. 11 illustrates an example of an uplink transmission according to an RF chain when an NCR performs relaying between a base station and a UE according to an embodiment of the disclosure.

Referring to FIG. 11, a UE 11-01 may transmit an uplink signal to a base station 11-03 through the relay of an NCR 11-02. In FIG. 11, reference numeral "11-00" illustrates an example of a situation in which an NCR-MT 11-04 and an NCR-Fwd 11-05 are each connected to a different RF chain 11-06, and reference numeral "11-10" illustrates an example of a situation in which the NCR-MT and the NCR-Fwd are connected to the same RF chain. An RF chain is a functional configuration consisting of a single radio link and a series of RF processing elements (i.e., antennas, power amplifiers, mixers) connected like a chain, and is responsible for increasing the frequency after converting a signal of a digital stage to an analog signal and transmitting the signal through various filters. One RF chain is used for one stream. Therefore, in reference numeral "11-00", since a signal transmitted by the NCR-Fwd after having been transmitted by the UE in the uplink and amplified, and a signal transmitted by the NCR-MT are transmitted to the base station through different RF chains, the signals may be transmitted in different frequency domains within the same time. On the other hand, in reference numeral "11-10", if the signal transmitted by the NCR-Fwd after having been transmitted by the UE and amplified and the signal transmitted by the NCR-MT are considered as different streams, the signal transmitted by the NCR-Fwd and the signal transmitted by the NCR-MT cannot be transmitted simultaneously in the same RF chain.

The NCR performs signal amplification and forwarding operations under the control of the base station, by utilizing the NCR-MT and NCR-Fwd structures described above. Since the amplification and forwarding are operation of directly amplifying a configured bandwidth, noise may also be amplified and forwarded. For example, in case that multiple NCRs forward signals to the base station in the uplink, a signal-to-noise ratio (SNR) of the base station may be degraded due to the increase in the noise floor of the base station. Additionally, due to the feature of NCR that pursues low prices, there is a possibility that the adjacent channel leakage ratio (ACLR) will increase due to poor filter performance. Due to the above drawbacks, the base station may turn on or off (ON/OFF) the amplification and forwarding operation of the NCR as needed. In one example, the NCR is OFF state by default and may be switched to the ON state to perform the amplification and forwarding operation when an access link beam indication is received or when it is configured/indicated to be ON state.

In an embodiment, the access link beam configuration of the NCR may be configured through higher layer signaling, for example, RRC or operation administration maintenance (OAM). The mapping relationship between the actual physical access link beam of the NCR and the access link beam index (or access link TCI state) for indications may be configured by the implementation of the NCR. Based on the access link beam configuration, the NCR may be configured with periodic, semi-persistent, or aperiodic indications for access link beam indication. For periodic indication, the base station may configure one or multiple pairs (of access link beam index and time resource), periodicity, and sub-carrier spacing (SCS) via higher layer signaling. For aperiodic indication, one or more access link beam index fields in DCI scrambled by an NCR-specific RNTI may indicate an access link beam, and one or more time resource fields may indicate a time resource. The SCS of the aperiodic indication may be the same as the SCS of the DCI. While definitions exist for periodic and aperiodic access link beam indications, there is not yet a specific definition for semi-persistent indication. The semi-persistent indication is required for the NCR to support the SPS PDSCH, CG-PUSCH, semi-persistent CSI-RS, and SRS of the UE. The following embodiments describe semi-persistent access link beam indications in detail.

First Embodiment: List Index Indication Method

The first embodiment describes a method for indicating an access link beam using a semi-persistent method. According to the first embodiment, a base station may configure a plurality of lists including one or more forwarding resources in an NCR via higher layer signaling (e.g., RRC), and may indicate a list to be activated/deactivated among one or more lists to the NCR via MAC-CE or SCI. Forwarding resources here refer to a bundle of access link beam indices (or access link TCI states) and of time resources corresponding thereto. The access link beam index (or access link TCI state) used may be configured for the NCR by the base station via higher layer signaling (e.g., RRC, OAM). The time resource may include at least one of a slot offset, a symbol offset, and a duration in symbol units.

The method according to the first embodiment has the disadvantage of less scheduling flexibility because the base station preconfigures the possible combinations of forwarding resources via higher layer signaling and then indicates the combinations of forwarding resources via MAC-CE or SCI. Since the MAC-CE or SCI indicates the forwarding resources in units of bundles, it has the advantage that the access link beam may be indicated with less MAC-CE payload or less SCI payload.

FIG. 12 illustrates an example relating to semi-persistent access link beam indication of an NCR according to a first embodiment of the disclosure.

Referring to FIG. 12, an NCR may receive configuration of one or more lists 12-01 via higher layer signaling 12-00. Each list includes one or more forwarding resources 12-02, and the forwarding resources may include a pair of an access link beam index (or access link TCI state) and a time resource. The base station may indicate one of the one or more lists 12-01 via MAC-CE or SCI 12-10. If the base station indicates List0 via the MAC-CE or SCI 12-10, the NCR may identify which access link beam is applied to which time resource, by referring to three forwarding resources included in List0. Referring to an access link beam 12-20, the NCR may receive the MAC-CE or SCI 12-10, transmit HARQ-ACK corresponding thereto through a PUCCH 12-21, and apply an access link beam index (or access link TCI state) to each time domain according to forwarding resources included in List0. The forwarding resource may indicate a specific beam to be applied to a specific time domain by a slot offset, a symbol offset, or a symbol unit duration. A beam indicated by the forwarding resource is specific to a single slot and may not indicate a beam beyond slot boundaries. For example, the first forwarding resource of List0 may be applied to a slot 12-22, the second forwarding resource may be applied to a slot 12-23, and the last resource may be applied to a slot 12-24.

Whether the indicated forwarding resources are applied to the uplink or downlink may be determined depending on a time division duplex (TDD) pattern direction configured by higher layer signaling. In an example, when the slots 12-22 and 12-23 are downlink and the slot 12-24 is uplink, the NCR may apply access link beam indices #0 and 1 to the downlink, and apply access link beam index #2 to the uplink.

For a slot offset of the forwarding resource, a slot in which a PUCCH is transmitted may be configured as a reference slot, or the first slot after 3 ms from the transmission of the PUCCH may be configured as the reference.

A case may occur in which a time resource of a beam applied by a semi-persistent access link beam indication method overlaps, even by at least one symbol, with a time resource of a beam indicated by a periodic or aperiodic access link beam indication method. In this case, the aperiodic access link beam indication method may have the highest priority, followed by the semi-persistent access link beam indication method, and then the periodic access link beam indication method. In case that a symbol to which a beam is applied using the periodic access link beam indication method overlaps with a symbol to which a beam is applied using the semi-persistent access link beam indication method, the NCR may apply the beam having been applied using the semi-persistent access link beam indication method. In case that a symbol to which a beam is applied using the semi-persistent access link beam indication method overlaps with a symbol to which a beam is applied using the aperiodic access link beam indication method, the NCR may apply the beam having been applied using the aperiodic access link beam indication method. In case that the time resource of the beam indicated by the semi-persistent access link beam indication method overlap, even by at least one symbol, that of the periodic/aperiodic access link beam indication method, the NCR may apply the access link beam by using at least one of the following methods.

Priority Method 1

In case that a time resource of a beam indicated by the semi-persistent method overlaps, even by at least one symbol, that of the periodic/aperiodic access link beam indication method, the corresponding symbol may be applied with an access link beam according to the priority described above. The non-overlapping symbols will be applied with an access link beam according to each method.

Priority Method 2

In case that a time resource of a beam indicated by the semi-persistent method overlaps, even by at least one symbol, that of the periodic/aperiodic method, the NCR may ignore a time resource of a lower priority in the corresponding slot. While a beam indicated by the semi-persistent method is being applied to all of symbols in the slot 12-24, when another beam is indicated to any one symbol of the slot 12-24 by the aperiodic method, a time resource of a beam of the slot 12-24 indicated by the semi-persistent method may be ignored.

Hereinafter, a method for configuring a semi-persistent access link beam using MAC-CE or SCI will be described in more detail.

If the base station performs semi-persistent access link beam indication through MAC-CE, the MAC-CE may include the following fields.

Activation/Deactivation

List Index

The NCR may identify whether the MAC-CE beam indication is activated or deactivated, based on 1-bit activation/deactivation field. If "activation" is indicated, the NCR applies the access link beam according to each forwarding resource included in the list, repeating the same every periodicity. If "deactivation" is indicated, the NCR deactivates the access link beam from a periodicity that appears after the first slot after 3 ms after transmitting the PUCCH including the HARQ-ACK corresponding to the MAC-CE.

According to an embodiment, the NCR may receive, through the list index field, an indication of one of the lists configured through higher layer signaling. The number of bits in the list index field may be determined by the maximum number of lists that may be configured by higher layer signaling. The list index field may be interpreted as at least one of the following methods of interpreting the list index field.

List Index Field Interpretation Method 1:

The list index field may indicate a single list index. In one example, if the maximum number of lists that may be configured for higher layer signaling is 64, then Ceil(LOG 2(64))=6 bit is required. Ceil is a function that unconditionally increases the number of decimal places, and LOG 2 is a log function with base 2.

If the list index field exists, and additionally the forwarding resource index field exists, the forwarding resource index field may indicate as a bitmap the forwarding resources included in the list indicated by the list index field. For example, if there are four forwarding resources in the specified List, a bitmap of 4 bits, in which each bit corresponds to a forwarding resource, may be indicated.

List Index Field Interpretation Method 2:

The list index field may indicate multiple list indices as a bitmap. Each bit of the list index field corresponds to a list configured via higher layer signaling. For example, if four lists are configured via higher layer signaling and the list index field has a value of "1001", the NCR knows that the first and last lists have been indicated.

The periodicity and SCS of semi-persistent access link beam indication may be configured via higher layer signaling and included in a list. Alternatively, the periodicity and SCS may be included as fields in the MAC-CE. Since the semi-persistent access beam indication in the NCR is to amplify and forward a semi-persistent channel or signal, it would be reasonable to consider the periodicity of the semi-persistent channel or signal as the periodicity of the semi-persistent access link beam indication. The maximum configured number of SPS PDSCH periodicities is determined by the SCS. The periodicity of SPS-PDSCH configured as 15 kHz SCS has 640 entries ranging from 1 ms to 640 ms, thereby requiring 10 bits. Therefore, the field for the periodicity of the semi-persistent access link beam indication may be allocated according to the SCS. The SCS may vary depending on a band in which the NCR is used. In case that the NCR is used in FR1 band, 15/30 kHz SCS is used, and in case that the NCR is used in FR2-1 band, 60/120 kHz SCS is used. In case that the NCR is used in FR2-2 band, 120/480/960 kHz SCS is used. Therefore, the SCS field may be allocated one or two bits depending on a band in which the NCR is used.

Figure 13:
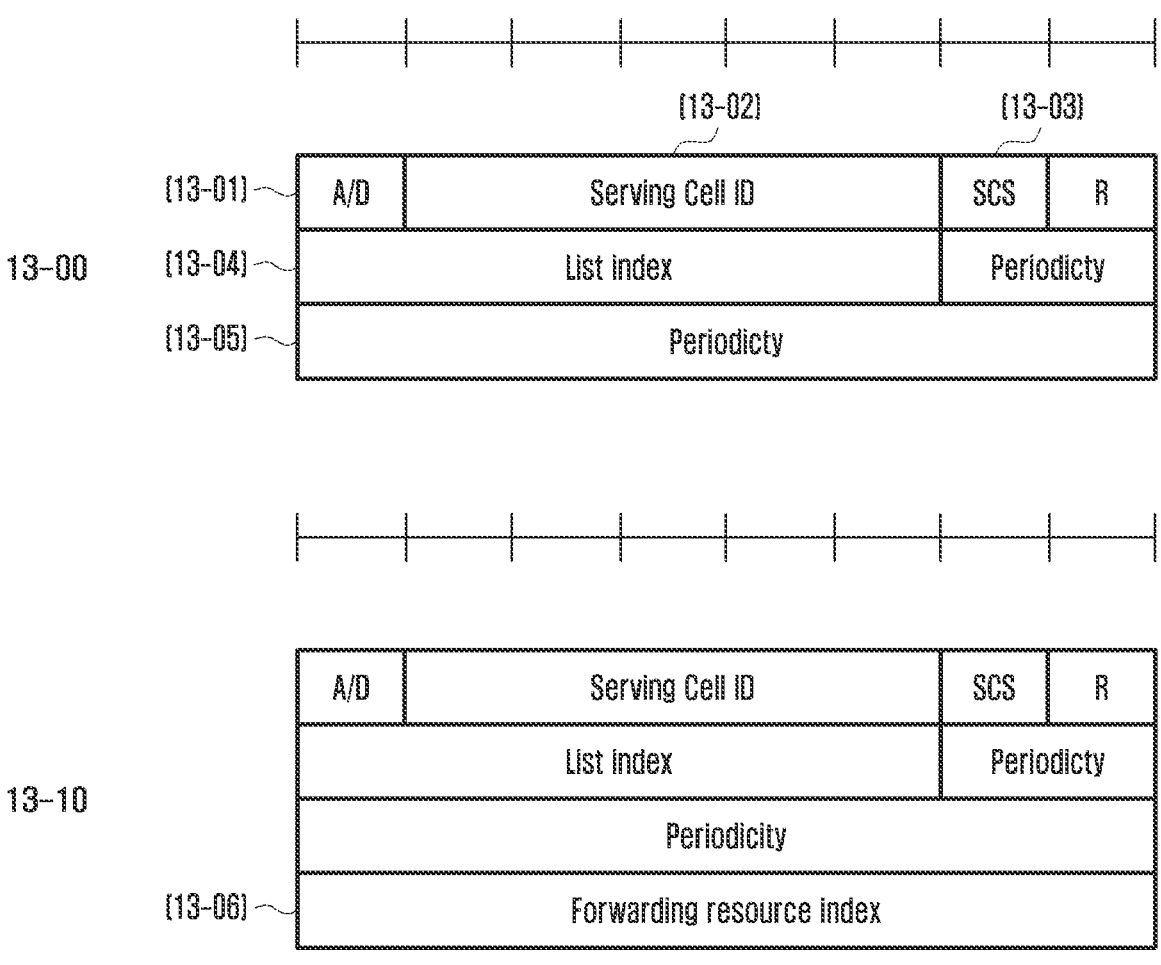
FIG. 13 illustrates an example relating to an access link beam indication of an NCR in a semi-persistent method via a MAC-CE according to an embodiment of the disclosure.

FIG. 13 illustrates an example relating to a method for access link beam indication of an NCR in a semi-persistent method via a MAC-CE according to an embodiment of the disclosure.

Referring to FIG. 13, reference numeral "13-00" indicates a case in which a forwarding resource index field 13-06 does not exist, and reference numeral "13-10" indicates a case in which the forwarding resource index field 13-06 exists. In the case of "13-00", an activation/deactivation field 13-01 is 1 bit, and the NCR may identify beam activation or deactivation based on the activation/deactivation field 13-01. A serving cell ID field 13-02 may indicate a cell in which the NCR performs amplification and transmission operations and having a cell ID to which the MAC-CE is applied. A list index field 13-04 is allocated 6 bits as one example. When the list index field is interpreted using the list index field interpretation method 1, the NCR may receive an indication of one of 64 lists through the list index field 13-04. When the list index field is interpreted using the list index field interpretation method 2, the NCR may receive an indication of one or more lists among six lists through the list index 13-04. The list index field 13-04 may change depending on the maximum number of lists configured by the base station. The NCR may apply an access link beam by referring to the list configured via higher layer signaling through the list index field and the forwarding resources included in the list. R is a reserved bit and has a value of "0". An SCS 13-03 has 1 bit for FR1 or FR2-1 as an example. In the case of FR1, one of a 15/30 kHz may be indicated, and in the case of FR2-1, one of a 60/120 kHz may be indicated. If the NCR is operating in the FR2-2 band, the NCR may be allocated 2 bits, and may receive an indication of one of 120/480/960 kHz. A periodicity field 13-05 has 10 bits of 640 entries because an operation of amplifying and forwarding the SPS-PDSCH of 15 kHz is described as an example. The NCR may receive, as the periodicity, an indication of a value of one of the 640 entries through the periodicity field 13-05. The number of bits of the periodicity field may be determined by the SCS field that is indicated earlier. If the SCS and periodicity configurations exist in the list configured via higher layer signaling, the SCS and periodicity fields may have 0 bits in the MAC-CE. If the list index field is interpreted using list index field interpretation method 2, multiple lists may be indicated and thus it is not possible to know an SCS and a periodicity to be used. When the list index field interpretation method 2 is used, the SCS and periodicity fields will exist. In the case of "13-10", the list index field is interpreted using the list index field interpretation method 1 and may refer to the forwarding resource index field 13-06 based on the indicated list. For example, if the maximum number of forwarding resources that may be included in a list is 8, then the forwarding resource index field has 8 bits, each bit indicating a forwarding resource included in the list. For example, if the forwarding resource index field has a value of "10001000", the value indicates the first and fifth forwarding resources included in the indicated list. If the forwarding resource index field does not exist, then all of forwarding resources of the indicated list are used.

In case that the base station performs semi-persistent access link beam indication through the SCI, there are at least two possible methods. The first is to have independent fields in the SCI, and the second is to reinterpret the fields of the SCI.

In the first method, the SCI may include the following fields

Activation/Deactivation

List index

The definitions of the activation/deactivation and list index fields are the same as that of the MAC-CE field described earlier. Whether the SCI includes the periodicity and SCS or not may be determined depending on whether the periodicity and SCS are included or not in a configuration via higher layer signaling. A first method performs semi-persistent access link beam indication based on independent fields, but has the disadvantage of adding fields that are not used other than this to the SCI.

In a second method, the SCI may reinterpret the access link beam index field and the time resource field for aperiodic access link beam indication as those for semi-persistent access link beam indication. An additional 1 bit of activation/deactivation field is required for the NCR to clearly identify whether the access link beam index field and time resource field of the SCI are those for aperiodic or semi-persistent access link beam indication. When the NCR recognizes that the SCI is for semi-persistent access link beam indication through the activation/deactivation field, the list index may be indicated by reinterpreting the access link beam index field. The NCR may interpret the most significant bit (MSB) of the first access link beam index field as the MSB of the list index, and may interpret the least significant bit (LSB) of the last access link beam index field as the LSB of the list index. In other words, the NCR may derive the list index by reinterpreting all of the bits of the access link beam index field arranged in order. The periodicity and SCS may be included in the list via higher layer signaling. The second method has the advantage of reusing existing SCI fields, thereby minimizing additional fields. However, if the number of bits in the access link beam index field of the SCI is smaller than the maximum configured number of list, there is a disadvantage that only a limited list may be indicated.

Second Embodiment: Resource Index Indication Method

The second embodiment describes a method for indicating an access link beam using a semi-persistent method. According to the second embodiment, a base station may configure one or more forwarding resources in an NCR via higher layer signaling (e.g., RRC), and may indicate a forwarding list to be activated/deactivated among one or more forwarding lists to the NCR via MAC-CE or SCI. Forwarding resources here refer to a bundle of access link beam indices (or access link TCI states) and of time resources corresponding thereto. In this case, the access link beam index (or access link TCI state) used may be configured for the NCR by the base station via higher layer signaling (e.g., RRC, OAM). The time resource may, for example, include at least one of a slot offset, a symbol offset, and a duration in symbol units.

There is a difference between the first and the second embodiments in that the second embodiment performs forwarding resource indication directly, whereas the first embodiment performs indication in a bundle of forwarding resources. By indicating forwarding resources directly, the second embodiment allows the base station to have more flexibility in beam scheduling. The MAC-CE payload or SCI payload may increase due to indication of multiple forwarding resources rather than a bundle of resources.

FIG. 14 illustrates an example relating to semi-persistent access link beam indication of an NCR according to an embodiment of the disclosure.

Referring to FIG. 14, the NCR may receive configuration of one or more forwarding lists 14-01 via higher layer signaling 14-00. Each forwarding list may include a pair of an access link beam index (or access link TCI state) and a time resource. The base station may indicate one of the one or more lists 14-01 via MAC-CE or SCI 14-10. If the base station indicates a forwarding resource index via the MAC-CE or SCI 14-10, the NCR may determine which access link beam is applied to which time resource, by referring to the corresponding forwarding resource. In an example, if forwarding resource indices of Resources #0, #3, and #6 are indicated via the MAC-CE or SCI 14-10, the NCR may refer to {Access link beam index #0, Time resource #0} for Resource #0, {Access link beam index #3, Time resource #3} for Resource #3, and {Access link beam index #6, Time resource #6} for Resource #6 so as to identify an access link beam and a time resource corresponding thereto. Referring to an access link beams 14-20, the NCR may receive the MAC-CE or SCI 14-10, transmit HARQ-ACK corresponding thereto through a PUCCH 14-21, and apply an access link beam to each time domain according to forwarding resources. The forwarding resource includes a slot offset, a symbol offset, and a symbol unit duration. The corresponding time domain corresponds to one access link beam. A beam indicated by a forwarding resource is specific to a single slot and does not indicate beams beyond slot boundaries. For example, Resource #0 may be applied to a slot 14-22, Resource #3 may be applied to a slot 14-23, and Resource #6 may be applied to a slot 14-24.

Whether the indicated forwarding resources are applied to the uplink or downlink may be determined depending on a TDD pattern direction configured by higher layer signaling. For example, when the slots 14-22 and 14-23 are downlink and the slot 14-24 is uplink, the NCR may apply access link beam indices #0 and 3 to the downlink, and apply access link beam index #6 to the uplink.

For a slot offset of the forwarding resource, a slot in which a PUCCH is transmitted may be configured as a reference slot, or the first slot after 3 ms from the transmission of the PUCCH may be configured as the reference.

A case may occur in which a time resource of a beam applied by a semi-persistent access link beam indication method overlaps, even by at least one symbol, a time resource of a beam indicated by a periodic or aperiodic access link beam indication method. The aperiodic access link beam indication method may have the highest priority, followed by the semi-persistent access link beam indication method, and then the periodic access link beam indication method. In case that a symbol to which a beam is applied using the periodic access link beam indication method overlaps with a symbol to which a beam is applied using the semi-persistent access link beam indication method, the NCR may apply the beam having been applied using the semi-persistent access link beam indication method. In case that a symbol to which a beam is applied using the semi-persistent access link beam indication method overlaps with a symbol to which a beam is applied using the aperiodic access link beam indication method, the NCR may apply the beam having been applied using the aperiodic access link beam indication method. In case that the time resource of the beam indicated by the semi-persistent access link beam indication method overlap, even by at least one symbol, that of the periodic/aperiodic access link beam indication method, the NCR may apply the access link beam by using at least one of the following methods.

Priority Method 1

In case that a time resource of a beam indicated by the semi-persistent method overlaps, even by at least one symbol, that of the periodic/aperiodic access link beam indication method, the corresponding symbol may be applied with an access link beam according to the priority described above. The non-overlapping symbols will be applied with an access link beam according to each method.

Priority Method 2

In case that a time resource of a beam indicated by the semi-persistent method overlaps, even by at least one symbol, that of the periodic/aperiodic method, the NCR may ignore a time resource of a lower priority in the corresponding slot. For example, while a beam indicated by the semi-persistent method is being applied to all of symbols in the slot 14-24, when another beam is indicated to any one symbol of the slot 14-24 by the aperiodic method, a time resource of a beam of the slot 14-24 indicated by the semi-persistent method may be ignored.

Hereinafter, a method for configuring a semi-persistent access link beam using MAC-CE or SCI will be described in more detail.

If the base station performs semi-persistent access link beam indication through MAC-CE, the MAC-CE may include the following fields.

Activation/Deactivation

Resource ID

Periodicity

SCS

The NCR may, for example, identify whether the MAC-CE beam indication is activated or deactivated, based on 1-bit activation/deactivation field. If "activation" is indicated, the NCR applies the access link beam according to each forwarding resource included in the list, repeating the same every periodicity. If "deactivation" is indicated, the NCR deactivates the access link beam from a periodicity that appears after the first slot after 3 ms after transmitting the PUCCH including the HARQ-ACK corresponding to the MAC-CE.

The NCR may receive, through the resource ID field, an indication of forwarding resources configured through higher layer signaling. The Resource ID field may be interpreted as at least one of the following methods.

Resource ID Field Interpretation Method 1:

One Resource ID field may indicate one of resource IDs configured by higher layer signaling. The number of bits in the Resource ID field may be determined according to the maximum number of forwarding resources that may be configured by higher layer signaling. If the maximum number of forwarding resources that may be configured by higher layer signaling is 256, then Ceil(LOG 2(256))=8 bit is required. In this case, ceil is a function that unconditionally increases the number of decimal places, and LOG 2 is a log function with base 2. If multiple resource IDs are indicated, multiple resource ID fields may be allocated.

In order for multiple Resource ID fields to be allocated, the NCR needs to know clearly about the number of the fields. The number of resources field allows the NCR to know how many forwarding resources are indicated to the MAC-CE. If the number of resources has a value of N, then N forwarding resources may be indicated.

Resource ID Field Interpretation Method 2:

In an embodiment one Resource ID field may indicate, as a bitmap, one or several of the Resource IDs configured by higher layer signaling. The number of bits in the Resource ID field may be determined by the maximum number of forwarding resources that may be configured by higher layer signaling. For example, if the maximum number of forwarding resources that may be configured by higher layer signaling is 256, 256 bits are required. Each bit of the bitmap would be capable of indicating one forwarding resource.

The periodicity and SCS fields of semi-persistent access link beam indication may indicate the periodicity and SCS of the indicated beam. Since the semi-persistent access beam indication of the NCR is to amplify and forward a semi-persistent channel or signal, it would be reasonable to consider the periodicity of the semi-persistent channel or signal as the periodicity of the semi-persistent access link beam indication. The maximum configured number of SPS PDSCH periodicities is determined by the SCS. The periodicity of SPS-PDSCH configured as 15 kHz SCS has 640 entries ranging from 1 ms to 640 ms, thereby requiring 10 bits. Therefore, the field for the periodicity of the semi-persistent access link beam indication may be allocated according to the SCS. The SCS may vary depending on a band in which the NCR is used. In case that the NCR is used in FR1 band, 15/30 kHz SCS is used, and in case that the NCR is used in FR2-1 band, 60/120 kHz SCS is used. In case that the NCR is used in FR2-2 band, 120/480/960 kHz SCS is used. Therefore, the SCS field may be allocated one or two bits depending on a band in which the NCR is used.

Figure 15:
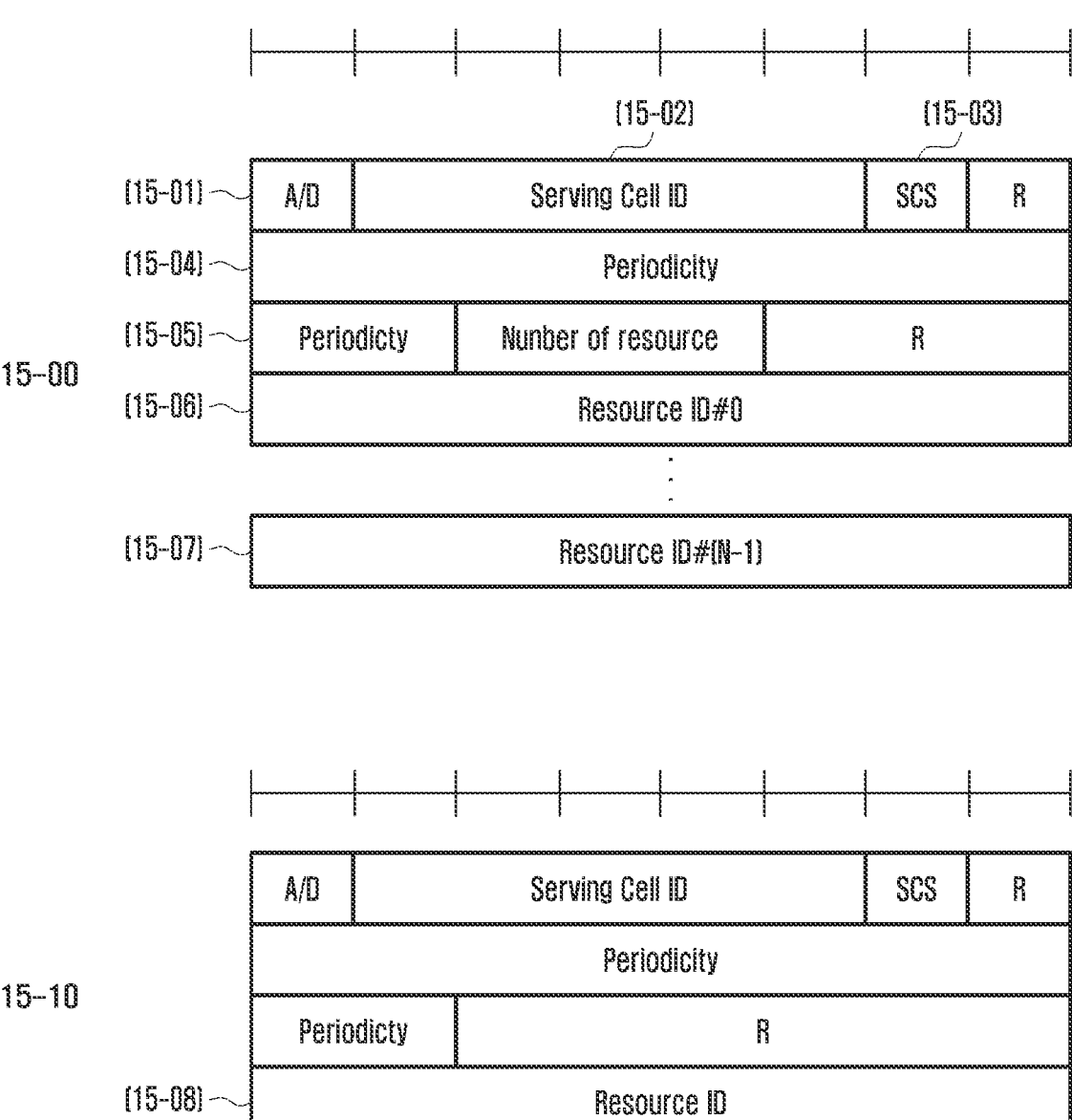
FIG. 15 illustrates an example relating to an access link beam indication of an NCR in a semi-persistent method via a MAC-CE according to an embodiment of the disclosure.

FIG. 15 illustrates an example relating to a method for access link beam indication of an NCR in a semi-persistent method via a MAC-CE according to an embodiment of the disclosure.

Referring to FIG. 15, reference numeral "15-00" indicates a case depending on Resource ID field interpretation method 1 and reference numeral "15-10" indicates a case depending on Resource ID field interpretation method 2. In the case of "15-00", the activation/deactivation field 15-01 is 1 bit, and the NCR may identify beam activation or deactivation based on the activation/deactivation field 15-01. A serving cell ID field 15-02 may indicate a cell in which the NCR performs amplification and transmission operations and having a cell ID to which the MAC-CE is applied. An SCS 15-03 has 1 bit for FR1 or FR2-1 as an example. In the case of FR1, one of a 15/30 kHz may be indicated, and in the case of FR2-1, one of a 60/120 kHz may be indicated. If the NCR is operating in the FR2-2 band, the NCR may be allocated 2 bits, and may receive an indication of one of 120/480/960 kHz. R is a reserved bit and has a value of 0. A periodicity field 15-04 has 10 bits of 640 entries because an operation of amplifying and forwarding the SPS-PDSCH of 15 kHz is described as an example. The NCR may receive, as the periodicity, an indication of a value of one of the 640 entries through the periodicity field 15-04. The number of bits of the periodicity field may be determined by the SCS field that is indicated earlier. The number of resources 15-05 is 3 bits in an example and allows up to 8 forwarding resources to be allocated. Resource IDs 15-06 or 15-07 have 8 bits because the maximum number that may be configured by higher layer signaling is 256 entries as an example. These fields may vary depending on the maximum number of forwarding resources configured by the base station. The first field 15-06 always exists, and the last field 15-07 may change depending on the value of number of resources 15-05. The NCR may apply the access link beam by referring to the forwarding resources corresponding to the Resource ID. In the case of "15-10", the NCR is able to the number of indicated forwarding resources by referring to the value of a resource ID field 15-08, and thus Number of resources field is not necessary. As one example, if eight forwarding resources are configured by higher layer signaling, the resource ID field 15-08 has 8 bits, and each bit indicates one forwarding resource. For example, when the Resource ID field has a value of "10001000", the first and fifth forwarding resources among the forwarding resources configured by signaling are indicated.

In case that the base station performs semi-persistent access link beam indication through the SCI, there are at least two possible methods. The first is to have independent fields in the SCI, and the second is to reinterpret the fields of the SCI.

In the first method, the SCI may include the following fields

Activation/Deactivation

Resource index

Periodicity

SCS

The definitions of the activation/deactivation and resource ID fields are the same as that of the MAC-CE field described earlier. The Resource index field may have one or multiple fields each indicating a resource index. A first method performs semi-persistent access link beam indication based on independent fields, but has the disadvantage of adding fields that are not used other than this to the SCI.

In a second method, the SCI may reinterpret the access link beam index field and the time resource field for aperiodic access link beam indication as those for semi-persistent access link beam indication. An additional 1 bit of activation/deactivation field is required for the NCR to clearly identify whether the access link beam index field and time resource field of the SCI are those for aperiodic or semi-persistent access link beam indication. When the NCR recognizes that the SCI is for semi-persistent access link beam indication through the activation/deactivation field, the forwarding resource indication may be indicated by reinterpreting the access link beam index field. For example, the NCR may interpret the most significant bit (MSB) of the first access link beam index field as the MSB, and may interpret the least significant bit (LSB) of the last access link beam index field as the LSB. The NCR may derive the forwarding resource index by reinterpreting all of the bits of the access link beam index field arranged in order. Specifically, the first X bit indicates the number of forwarding resources, and each forwarding resource index may be identified by making the remaining bits except for the bits corresponding to the periodicity and SCS to be equal to the number of forwarding resources. The NCR may learn the X bit through higher layer signaling. The second method has the advantage of reusing existing SCI fields, thereby minimizing additional fields. If the number of bits in the access link beam index field of the SCI is smaller than the maximum configured number of forwarding resources, there is a disadvantage that only limited forwarding resources may be indicated.

Third Embodiment: Time Resource Index Indication Method

The third embodiment describes a method for indicating an access link beam using a semi-persistent method. According to the third embodiment, a base station may configure multiple lists including one or more time resources in an NCR via higher layer signaling (e.g., RRC), and may indicate a list to be activated/deactivated to the NCR via MAC-CE or SCI. Further, the base station may indicate, via the MAC-CE or SCI, an access link beam index (or access link TCI state) corresponding to a time resource included in a list. The time resource indicates a bundle of time resources such as, a slot offset, a symbol offset, and a symbol length. The access link beam index used may be configured for the NCR by the base station via higher layer signaling (e.g., RRC, OAM).

There is a difference between the first and the third embodiments in that the first embodiment performs indication in a bundle of forwarding resources, whereas the third embodiment separates the forwarding resources into beam index (or access link TCI state) and time resources, and the time resources are indicated as a bundle thereof and the beam index (or access link TCI state) is indicated directly. The third embodiment allows the base station to have more flexibility in scheduling beams by directly indicating the beam index (or access link TCI state). Since the beam index (or access link TCI state) is not included in a bundle, the MAC-CE payload or SCI payload may increase.

Figure 16:
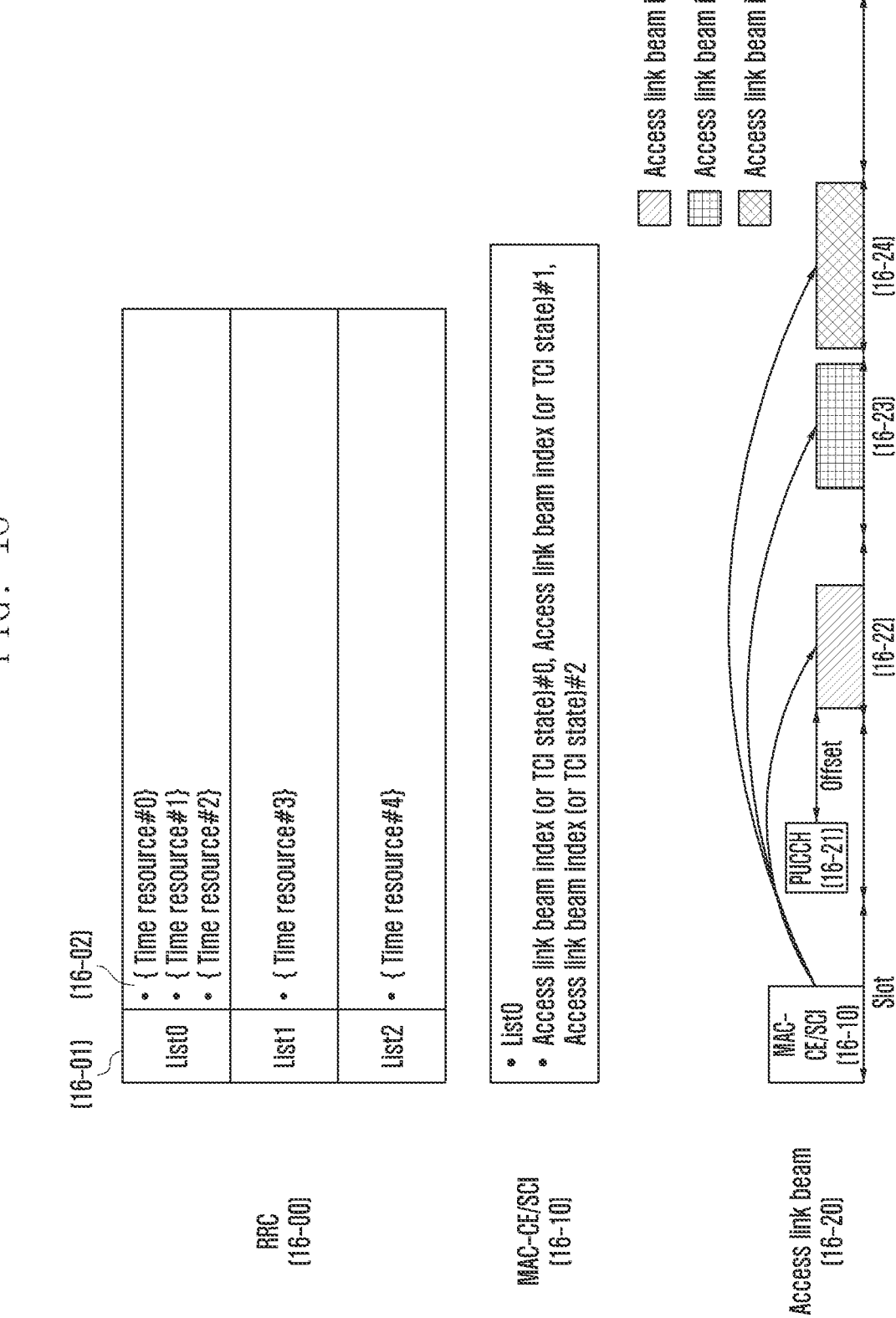
FIG. 16 illustrates an example relating to an access link beam indication of an NCR in a semi-persistent method according to an embodiment of the disclosure.

FIG. 16 illustrates an example relating to semi-persistent access link beam indication of an NCR according to an embodiment of the disclosure.

Referring to FIG. 16, the NCR may receive configuration of one or more lists 16-01 via higher layer signaling 16-00. Each of lists includes one or multiple time resources 16-02. If the base station indicates List0 via MAC-CE or SCI 16-10, the NCR may identify a beam index to which a time resource is to be applied, by referring to three time resources in List0. Additionally, beam indices corresponding to time resources may be indicated via the MAC-CE or SCI 16-10. Referring to an access link beam 16-20, the NCR may receive the MAC-CE or SCI 16-10, transmit HARQ-ACK corresponding thereto through a PUCCH 16-21, and apply the access link beam to each time domain according to a time resource included in List0. The access link beam index (or access link TCI state) may refer to the access link beam index (or access link TCI state) indicated by the MAC-CE or the SCI 16-10. The NCR may identify a beam to be applied in the corresponding time domain by combining the time resource obtained from List0 and the access link beam index (or access link TCI state). A beam corresponding to a time resource is specific to a slot and does not indicate a beam beyond slot boundaries. The first time resource in List0 is applied to a slot 16-22, the second time resource is applied to a slot 16-23, and the last resource is applied to a slot 16-24.

Whether the indicated forwarding resources are applied to the uplink or downlink may be determined depending on a TDD pattern direction configured by higher layer signaling. For example, when the slots 16-22 and 16-23 are downlink and the slot 16-24 is uplink, the NCR may apply access link beam indices #0 and 1 to the downlink, and apply access link beam index #2 to the uplink.

For a slot offset of the forwarding resource, a slot in which a PUCCH is transmitted may be configured as a reference slot, or the first slot after 3 ms from the transmission of PUCCH may be configured as the reference.

A case may occur in which a time resource of a beam applied by a semi-persistent access link beam indication method overlaps, even by at least one symbol, a time resource of a beam indicated by a periodic or aperiodic access link beam indication method. In this case, the aperiodic access link beam indication method may have the highest priority, followed by the semi-persistent access link beam indication method, and then the periodic access link beam indication method. In an example, in case that a symbol to which a beam is applied using the periodic access link beam indication method overlaps with a symbol to which a beam is applied using the semi-persistent access link beam indication method, the NCR may apply the beam having been applied using the semi-persistent access link beam indication method. In another example, in case that a symbol to which a beam is applied using the semi-persistent access link beam indication method overlaps with a symbol to which a beam is applied using the aperiodic access link beam indication method, the NCR may apply the beam having been applied using the aperiodic access link beam indication method. In case that the time resource of the beam indicated by the semi-persistent access link beam indication method overlap, even by at least one symbol, that of the periodic/aperiodic access link beam indication method, the NCR may apply the access link beam by using at least one of the following methods.

Priority Method 1

In case that a time resource of a beam indicated by the semi-persistent method overlaps, even by at least one symbol, that of the periodic/aperiodic access link beam indication method, the corresponding symbol may be applied with an access link beam according to the priority described above. The non-overlapping symbols will be, for example, applied with an access link beam according to each method.

Priority Method 2

In case that a time resource of a beam indicated by the semi-persistent method overlaps, even by at least one symbol, that of the periodic/aperiodic method, the NCR may ignore a time resource of a lower priority in the corresponding slot. While a beam indicated by the semi-persistent method is being applied to all of symbols in the slot 16-24, when another beam is indicated to any one symbol of the slot 16-24 by the aperiodic method, a time resource of a beam of the slot 16-24 indicated by the semi-persistent method may be ignored.

Hereinafter, a method for configuring a semi-persistent access link beam using MAC-CE or SCI will be described in more detail.

If the base station performs semi-persistent access link beam indication through MAC-CE, the MAC-CE may include the following fields.

Activation/Deactivation

Time domain resource list index

Beam index

The NCR may identify whether the MAC-CE beam indication is activated or deactivated, based on 1-bit activation/deactivation field. If "activation" is indicated, the NCR applies the access link beam according to each time resource included in the list, repeating the same every periodicity. If "deactivation" is indicated, the NCR deactivates the access link beam from a periodicity that appears after the first slot after 3 ms after transmitting the PUCCH including the HARQ-ACK corresponding to the MAC-CE.

The NCR may receive, through the time domain resource index field, an indication of time resources configured through higher layer signaling. The number of bits in the list index field may be determined according to the maximum number of lists that may be configured by higher layer signaling. If the maximum number of lists that may be configured by higher layer signaling is 64, then Ceil(LOG 2(64))=6 bit is required. In this case, ceil is a function that unconditionally increases the number of decimal places, and LOG 2 is a log function with base 2. If a time domain resource index field exists and additionally a forwarding resource index field exists, the forwarding resource index field may indicate the time resources included in the list indicated by the time domain resource index field as a bitmap. If there are four time resources in the indicated list, a bitmap of 4 bits, where each bit corresponds to a time resource, may be indicated.

The NCR may identify an access link beam index (or access link TCI state) to be applied in the time domain resource indicated in the time domain resource index field, by referring to one or more beam index fields. The NCR expects at least one beam index field to exist. If the forwarding resource index field does not exist, the NCR may expect the number of beam index fields to be equal to the number of time resources included in the time domain resource index field. If the forwarding resource index field exists, the NCR may expect the number of beam index fields to equal the number of time resources indicated by the forwarding resource index field. The indicated time resources may sequentially correspond one-to-one to the access link beam index (or access link TCI state).

The periodicity and SCS of semi-persistent access link beam indication may be configured by higher layer signaling and included in a list. Alternatively, the periodicity and SCS of semi-persistent access link beam indication may be included in fields in the MAC-CE. Since the semi-persistent access beam indication in the NCR is to amplify and forward a semi-persistent channel or signal, it would be reasonable to consider the periodicity of the semi-persistent channel or signal as the periodicity of the semi-persistent access link beam indication. In one example, the maximum configured number of SPS PDSCH periodicities is determined by the SCS. The periodicity of SPS-PDSCH configured as 15 kHz SCS has 640 entries ranging from 1 ms to 640 ms, thereby requiring 10 bits. Therefore, the field for the periodicity of the semi-persistent access link beam indication may be allocated according to the SCS. The SCS may vary depending on a band in which the NCR is used. In case that the NCR is used in FR1 band, 15/30 kHz SCS is used, and in case that the NCR is used in FR2-1 band, 60/120 kHz SCS is used. In case that the NCR is used in FR2-2 band, 120/480/960 kHz SCS is used. Therefore, the SCS field may be allocated one or two bits depending on a band in which the NCR is used.

FIG. 17 illustrates an example relating to a method for access link beam indication of an NCR in a semi-persistent method via a MAC-CE according to an embodiment of the disclosure.

Referring to FIG. 17, reference numeral "17-00" indicates a case in which a forwarding resource index field 17-08 does not exist, and reference numeral "17-10" indicates a case in which the forwarding resource index field 17-08 exists. In the case of "17-00", an activation/deactivation field 17-01 is 1 bit, and the NCR may identify beam activation or deactivation based on the activation/deactivation field 17-01. A serving cell ID field 17-02 may indicate a cell in which the NCR performs amplification and transmission operations and having a cell ID to which the MAC-CE is applied. A time domain resource list index field 17-04 has been allocated 6 bits as one example, and may receive an indication of one of 64 lists. The time domain resource list index field 17-04 may, for example, change depending on the maximum number of time domain resource lists configured by a base station. The NCR may apply an access link beam by referring to the time domain resource list configured via higher layer signaling through the time domain resource list index field and the time resources included in the list. R is a reserved bit and has a value of "0". An SCS 17-03 has 1 bit for FR1 or FR2-1 as an example. In the case of FR1, one of a 15/30 kHz may be indicated, and in the case of FR2-1, one of a 60/120 kHz may be indicated. If the NCR is operating in the FR2-2 band, the NCR may be allocated 2 bits, and may receive an indication of one of 120/480/960 kHz. A periodicity field 17-05 has 10 bits of 640 entries because an operation of amplifying and forwarding the SPS-PDSCH of 15 kHz is described as an example. The NCR may receive, as the periodicity, an indication of a value of one of the 640 entries. The number of bits of the periodicity field may be determined by the SCS field that is indicated earlier. If the SCS and periodicity configurations exist in the list configured via higher layer signaling, the SCS and periodicity fields may not exist. Beam index fields 17-06 and 17-07 indicate an access link beam index (or access link TCI state) corresponding to the indicated time domain resource list. "N", which is the number of beam index fields 17-07, is expected to be equal to the number of time resources. In the case of "17-10", if the forwarding resource index field 17-08 exists, all or only some of the time resources in the list indicated by the time domain resource list index may be referred to. For example, if the maximum number of time resources that may be included in a list is 8, then the forwarding resource index field has 8 bits, each bit indicating a time resource included in the time domain resource list. For another example, if the forwarding resource index field has a value of "10001000", the value indicates the first and fifth time resources included in the indicated list. The number of beam index fields, N, is expected to be equal to the number of time resources indicated by the forwarding resource index field. If the forwarding resource index field does not exist, it may be seen that all of time resources of the indicated list are used.

In case that the base station performs semi-persistent access link beam indication through the SCI, there are at least two possible methods. The first is to have independent fields in the SCI, and the second is to reinterpret the fields of the SCI.

In the first method, the SCI may include the following fields

Activation/Deactivation

Time domain resource list index

Beam index

The definitions of the activation/deactivation, the time domain resource list index, and the beam index field are the same as that of the MAC-CE field described earlier. Whether the SCI includes the periodicity and SCS or not may be determined depending on whether the periodicity and SCS are included or not in a configuration via higher layer signaling. A first method performs semi-persistent access link beam indication based on independent fields, but has the disadvantage of adding fields that are not used other than this to the SCI.

In a second method, the SCI may reinterpret the access link beam index field and the time resource field for aperiodic access link beam indication as those for semi-persistent access link beam indication. An additional 1 bit of activation/deactivation field is required for the NCR to clearly identify whether the access link beam index field and time resource field of the SCI are those for aperiodic or semi-persistent access link beam indication. When the NCR recognizes that the SCI is for semi-persistent access link beam indication through the activation/deactivation field, the time resource field of the SCI indicates a time domain resource list index. In addition, the beam index fields of the SCI may each indicate an access link beam corresponding to an indicated time resource included in the time domain resource list. The periodicity and SCS will be included in the list via higher layer signaling. The second method has the advantage of reusing existing SCI fields, thereby minimizing additional fields. If the number of bits in the access link beam index field of the SCI is smaller than the maximum configured number of time resources, there is a disadvantage that only limited time resources may be indicated.

Fourth Embodiment: Resource Indication Method

In the fourth embodiment, a method of indicating an access link beam in a semi-persistent method will be described. According to the fourth embodiment, a base station may indicate an access link beam and a corresponding time resource through an MAC-CE. At this time, the access link beam index (or access link TCI state) used may be configured for the NCR by the base station through higher layer signaling (e.g., RRC, OAM). The time resource includes a slot offset, a symbol offset, and a duration in symbol units.

There is a difference between the first and the fourth embodiments in that the first embodiment indicates the access link beam and the corresponding time resource in a bundle, whereas the fourth embodiment directly indicates the access link beam and the corresponding time resource. The fourth embodiment allows the base station to schedule beams more flexibly by indicating resources through the MAC-CE directly. However, since multiple resources are indicated rather than a bundle of resources, the MAC-CE payload may increase.

Figure 18:
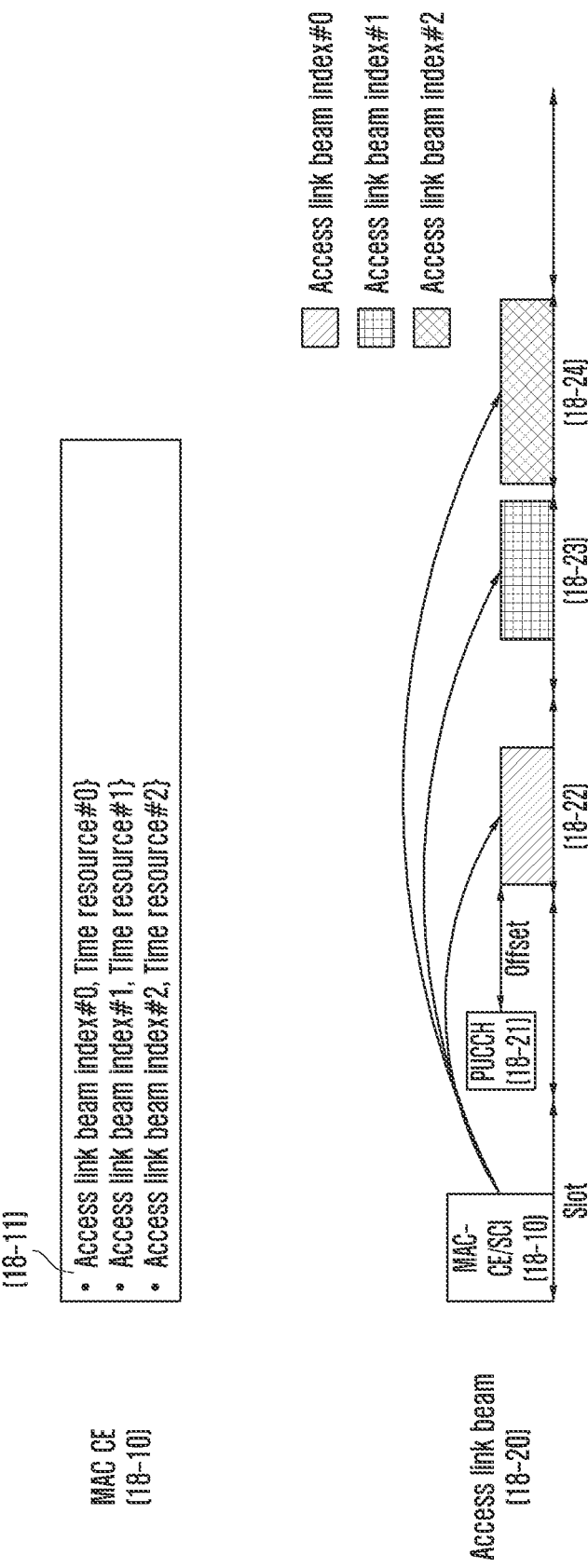
FIG. 18 illustrates an example relating to an access link beam indication of an NCR in a semi-persistent method according to an embodiment of the disclosure.

FIG. 18 illustrates an example relating to semi-persistent access link beam indication of an NCR according to an embodiment of the disclosure.

Referring to FIG. 18, if the base station indicates a forwarding resource 18-11 via an MAC-CE 18-10, the NCR may identify which access link beam is applied to which time resource by referring to the forwarding resource. For example, if {Access link beam index #0, Time resource #0}, {Access link beam index #1, Time resource #1}, and {Access link beam index #2, Time resource #2} are indicated via the MAC-CE 18-10, the NCR may identify the corresponding access link beam and time resource. Referring to an access link beam 18-20, the NCR may receive the MAC-CE 18-10, transmit HARQ-ACK corresponding thereto through a PUCCH 18-21, and apply an access link beam to each time domain according to the forwarding resource 18-11. The time domain corresponds to one access link beam index (or access link TCI state). A beam indicated by a forwarding resource is specific to a single slot and does not indicate beams beyond slot boundaries. In an example, the first forwarding resource (Access link beam index #0, Time resource #0) may be applied to a slot 18-22, the second forwarding resource (Access link beam index #1, Time resource #1) may be applied to a slot 18-23, and the third forwarding resource (Access link beam index #2, Time resource #2) may be applied to a slot 18-24.

Whether the indicated forwarding resources are applied to the uplink or downlink may be determined depending on a TDD pattern direction configured by higher layer signaling. When the slots 18-22 and 18-23 are downlink and the slot 18-24 is uplink, the NCR may apply access link beam indices #0 and 1 to the downlink, and apply access link beam index #2 to the uplink.

For a slot offset of the forwarding resource, a slot in which a PUCCH is transmitted may be configured as a reference slot, or the first slot after 3 ms from the transmission of the PUCCH may be configured as the reference.

A case may occur in which a time resource of a beam applied by a semi-persistent access link beam indication method overlaps, even by at least one symbol, a time resource of a beam indicated by a periodic or aperiodic access link beam indication method. The aperiodic access link beam indication method may have the highest priority, followed by the semi-persistent access link beam indication method, and then the periodic access link beam indication method. For one example, in case that a symbol to which a beam is applied using the periodic access link beam indication method overlaps with a symbol to which a beam is applied using the semi-persistent access link beam indication method, the NCR may apply the beam having been applied using the semi-persistent access link beam indication method. As another example, in case that a symbol to which a beam is applied using the semi-persistent access link beam indication method overlaps with a symbol to which a beam is applied using the aperiodic access link beam indication method, the NCR may apply the beam using the aperiodic access link beam indication method. In case that the time resource of the beam indicated by the semi-persistent access link beam indication method overlap, even by at least one symbol, that of the periodic/aperiodic access link beam indication method, the NCR may apply the access link beam by using at least one of the following methods.

Priority Method 1

In case that a time resource of a beam indicated by the semi-persistent method overlaps, even by at least one symbol, that of the periodic/aperiodic access link beam indication method, the corresponding symbol may be applied with an access link beam according to the priority described above. The non-overlapping symbols will be applied with an access link beam according to each method.

Priority Method 2

In case that a time resource of a beam indicated by the semi-persistent method overlaps, even by at least one symbol, that of the periodic/aperiodic method, the NCR may ignore a time resource of a lower priority in the corresponding slot. While a beam indicated by the semi-persistent method is being applied to all of symbols in the slot 18-24, when another beam is indicated to any one symbol of the slot 18-24 by the aperiodic method, a time resource of a beam of the slot 18-24 indicated by the semi-persistent method may be ignored.

Hereinafter, a method for configuring a semi-persistent access link beam using MAC-CE will be described in more detail.

If the base station performs semi-persistent access link beam indication through MAC-CE, the MAC-CE may include the following fields.

Activation/Deactivation

Number of resources

Slot offset

SLIV

Beam index

Periodicity

SCS

The NCR may, for example, identify whether the MAC-CE beam indication is activated or deactivated, based on 1-bit activation/deactivation field. If "activation" is indicated, the NCR applies the access link beam according to each forwarding resource included in a list, repeating the same every periodicity. If "deactivation" is indicated, the NCR deactivates the access link beam from a periodicity that appears after the first slot after 3 ms after transmitting the PUCCH including the HARQ-ACK corresponding to the MAC-CE.

In order for multiple forwarding resources to be indicated, the NCR needs to know clearly about the number of forwarding resources. Number of resources field allows the NCR to know how many forwarding resources are being indicated for the MAC-CE. If the number of resources has a value of N, then N forwarding resources may be indicated.

A slot offset field indicates a slot to which an access link beam is to be applied. A reference slot may be a slot in which a PUCCH including HARQ-ACK corresponding to the MAC-CE has been transmitted, or may be the first slot after 3 ms after transmission of the PUCCH.

An SLIV field indicates a start and a duration of a symbol to which an access link beam is to be applied. The SLIV may be calculated in the same method as that for the SLIV used for conventional data transmission.

The beam index field, for example, indicates an access link beam index (or access link TCI state) to be applied in a time resource indicated by the slot offset and SLIV field.

The periodicity and the SCS field of semi-persistent access link beam indication may indicate the periodicity and SCS of the indicated beam. Since the semi-persistent access beam indication of the NCR is to amplify and forward a semi-persistent channel or signal, it would be reasonable to consider the periodicity of the semi-persistent channel or signal as the periodicity of the semi-persistent access link beam indication. For example, the maximum configured number of SPS PDSCH periodicities is determined by the SCS. The periodicity of SPS-PDSCH configured as 15 kHz SCS has 640 entries ranging from 1 ms to 640 ms, thereby requiring 10 bits. As such, the field for the periodicity of the semi-persistent access link beam indication may be allocated according to the SCS. The SCS may vary depending on a band in which the NCR is used. In case that the NCR is used in FR1 band, 15/30 kHz SCS is used, and in case that the NCR is used in FR2-1 band, 60/120 kHz SCS is used. In case that the NCR is used in FR2-2 band, 120/480/960 kHz SCS is used. Therefore, the SCS field may be allocated one or two bits depending on a band in which the NCR is used.

Figure 19:
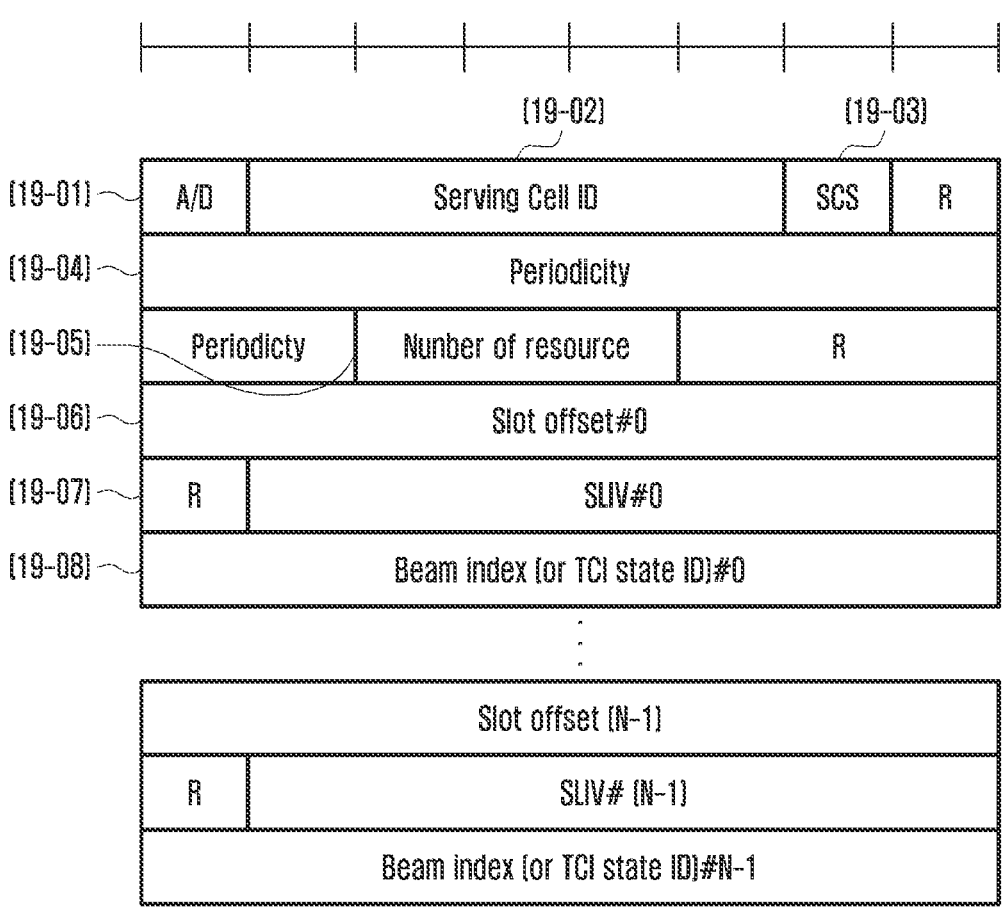
FIG. 19 illustrates an example relating to a method for access link beam indication of an NCR in a semi-persistent method via a MAC-CE according to an embodiment of the disclosure.

FIG. 19 illustrates an example relating to a method for access link beam indication of an NCR in a semi-persistent method via a MAC-CE according to an embodiment of the disclosure.

Referring to FIG. 19, an activation/deactivation field 19-01 is 1 bit, and the NCR may identify beam activation or deactivation based on the activation/deactivation field 19-01. A serving cell ID field 19-02 may indicate a cell in which the NCR performs amplification and transmission operations and having a cell ID to which the MAC-CE is applied. An SCS 19-03 has 1 bit for FR1 or FR2-1 as an example. In the case of FR1, one of a 15/30 kHz may be indicated, and in the case of FR2-1, one of a 60/120 kHz may be indicated. If the NCR is operating in the FR2-2 band, the NCR may be allocated 2 bits, and may receive an indication of one of 120/480/960 kHz. R is a reserved bit and has a value of 0. A periodicity field 19-04 has 10 bits of 640 entries because an operation of amplifying and forwarding the SPS-PDSCH of 15 kHz is described as an example. The NCR may receive, as the periodicity, an indication of a value of one of the 640 entries through the periodicity field 19-04. The number of bits of the periodicity field may be determined by the SCS field that is indicated earlier. Number of resources field 19-05 is 3 bits in one example, and up to 8 forwarding resources may be allocated. A slot offset field 19-06, an SLIV field 19-07, and a beam index 19-08 field configure one forwarding resource. For example, the slot offset field may be allocated 8 bits, assuming that it is configured as 0 to 128, similar to PDSCH. The SLIV field may also be allocated 7 bits, assuming that it is configured as 0 to 127, similar to PDSCH. The beam index field may be determined depending on the maximum number of access link beam indices (or access link TCI states) that is configured to be able to be received by the NCR. The NCR may know one forwarding resource by referring all of the slot offset, SLIV, and beam index fields. The number of forwarding resources, N, is expected to be equal to the value of the Number of resources field.

Figure 20:
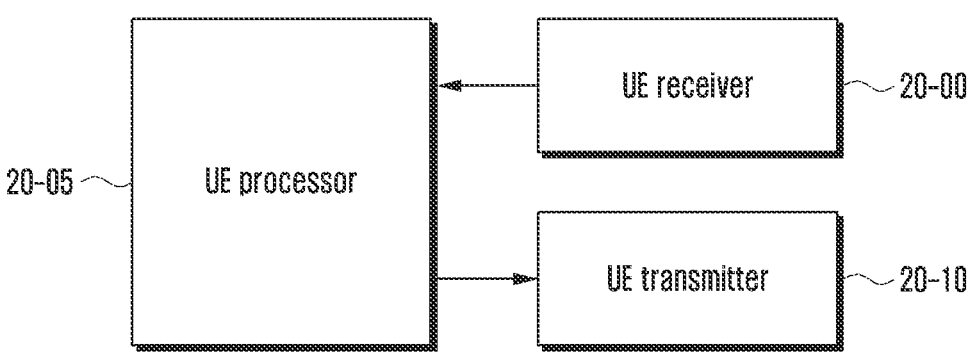
FIG. 20 is a block diagram showing the structure of a UE in a wireless communication system according to an embodiment of the disclosure.

FIG. 20 is a block diagram showing the structure of a UE in a wireless communication system according to an embodiment of the disclosure.

Referring to FIG. 20, a UE may include a UE receiver 20-00, a UE transmitter 20-10, and a UE processor (controller) 20-05.

For example, since an NCR that relays between a UE and a base station may appear to be a terminal from the viewpoint of the base station, the UE of FIG. 20 may be an NCR. The NCR may include a receiver, a transmitter, and a processor (controller).

The UE receiver 20-00 and the UE transmitter 20-10 may be referred to as a transceiver. According to the communication method of a UE described above, the UE receiver 20-00, the UE transmitter 20-10, and the UE processor 20-05 may operate. However, the elements of the UE are not limited to the above-described examples. The UE may include more elements (e.g., memory, etc.) or fewer elements than the aforementioned elements. In addition, the UE receiver 20-00, the UE transmitter 20-10, and the UE processor 20-05 may be implemented in the form of a single chip.

The UE receiver 20-00 and the UE transmitter 20-10 (or transceiver) may transmit and receive signals to and from the base station. The signals may include control information and data. The transceiver may include an RF transmitter for up-converting and amplifying the frequency of a transmitted signal, and an RF receiver for low-noise amplifying a received signal and down-converting the frequency. This is only an embodiment of the transceiver, and elements of the transceiver are not limited to the RF transmitter and the RF receiver.

In addition, the transceiver may receive a signal through a wireless channel, output the signal to the UE processor 20-05, and transmit the signal output from the UE processor 20-05 through the wireless channel.

A memory (not shown) may store programs and data required for operation of the UE. Additionally, the memory may store control information or data included in a signal obtained from the UE. The memory may include a storage medium such as a ROM, a RAM, a hard disk, a CD-ROM, and a DVD, or a combination of storage media.

The UE processor 20-05 may control a series of processes so that the UE may operate according to the above-described embodiment of the disclosure. The UE processor 20-05 may be implemented as a controller or one or more processors.

Figure 21:
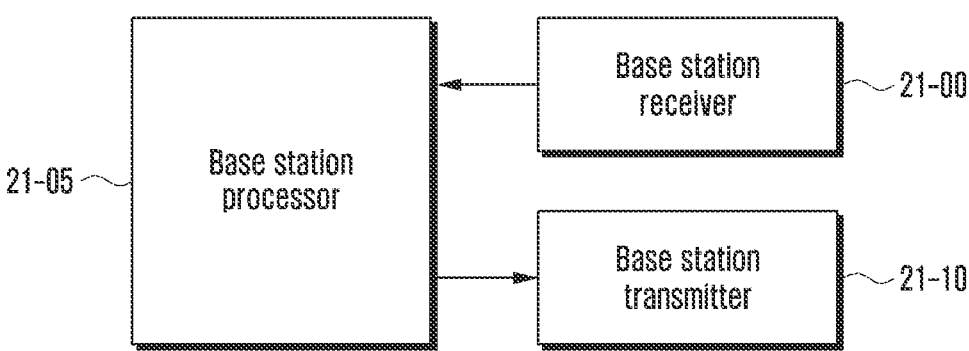
FIG. 21 is a block diagram showing the structure of a base station in a wireless communication system according to an embodiment of the disclosure.

FIG. 21 is a block diagram showing the structure of a base station in a wireless communication system according to an embodiment of the disclosure.

Referring to FIG. 21, a base station may include a base station receiver 21-00, a base station transmitter 21-10, and a base station processor (controller) 21-05.

For example, since an NCR that relays between a UE and a base station may appear to be a base station from the viewpoint of the UE, the base station of FIG. 21 may be an NCR. For example, the NCR may include a receiver, a transmitter, and a processor (controller).

The base station receiver 21-00 and the base station transmitter 21-10 may be referred to as a transceiver. According to the communication method of the base station described above, the base station receiver 21-00, the base station transmitter 21-10, and the base station processor 21-05 may operate. Elements of the base station are not limited to the above-described examples. For example, the base station may include more elements (e.g., memory, etc.) or fewer elements than the aforementioned elements. In addition, the base station receiver 21-00, the base station transmitter 21-10, and the base station processor 21-05 may be implemented in the form of a single chip.

The base station receiver 21-00 and the base station transmitter 21-10 (or transceiver) may transmit and receive signals to and from a UE. The signals may include control information and data. The transceiver may include an RF transmitter for up-converting and amplifying the frequency of a transmitted signal, and an RF receiver for low-noise amplifying a received signal and down-converting the frequency. However, this is only an embodiment of the transceiver, and elements of the transceiver are not limited to the RF transmitter and the RF receiver.

Additionally, the transceiver may receive a signal through a radio channel, output the signal to the base station processor 21-05, and transmit the signal output from the base station processor 21-05 through a radio channel.

A memory (not shown) may store programs and data required for the operation of the base station. In addition, the memory may store control information or data included in a signal obtained from the base station. The memory may include a storage medium such as a ROM, a RAM, a hard disk, a CD-ROM, and a DVD, or a combination of storage media.

The base station processor 21-05 may control a series of processes so that the base station operates according to the above-described embodiment of the disclosure. The base station processor 21-05 may be implemented as a controller or one or more processors.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essence of the disclosure.

Although not set forth herein, methods that use separate tables or information including at least one element included in the tables proposed in the disclosure are also possible.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network-controlled repeater (NCR) in a communication system, the method comprising:
   receiving, from a base station via radio resource control information (RRC) message, configuration of one or more sets of forwarding resources for an access link;
   receiving, from the base station, medium access control control element (MAC CE) indicating a set of forwarding resources among the one or more sets of forwarding resources; and
   transmitting a physical uplink control channel (PUCCH) including hybrid automatic repeat request acknowledgement (HARQ-ACK) information associated with the MAC CE in a slot,
   wherein the set of forwarding resources comprises at least one forwarding resource,
   wherein each of the at least one forwarding resource is associated with a time resource and a beam index,
   wherein the MAC CE includes a bit field indicating activation or deactivation of the set of forwarding resources, and
   wherein the set of forwarding resources is activated or deactivated based on a first slot that is after 3 ms from the slot where the PUCCH including the HARQ-ACK information associated with the MAC CE is transmitted.

2. The method of claim 1, wherein the time resource is defined based on a slot offset, a symbol offset and time duration in number of symbols.

3. The method of claim 1, wherein the configuration includes a periodicity and a subcarrier spacing for the set of forwarding resources.

4. The method of claim 1,
   wherein the configuration includes indices of the one or more sets of forwarding resources,
   wherein the MAC CE includes a field for indicating an index of the set of forwarding resources among the indices of the one or more sets of forwarding resources, and
   wherein a size of the field is defined based on a maximum number of the one or more sets of forwarding resources.

5. A method performed by a base station in a communication system, the method comprising:
   transmitting, to a network-controlled repeater (NCR) via radio resource control information (RRC) message, configuration of one or more sets of forwarding resources for an access link;
   transmitting, to the NCR, medium access control control element (MAC CE) indicating a set of forwarding resources among the one or more sets of forwarding resources; and
   receiving a physical uplink control channel (PUCCH) including hybrid automatic repeat request acknowledgement (HARQ-ACK) information associated with the MAC CE in a slot,
   wherein the set of forwarding resources comprises at least one forwarding resource,
   wherein each of the at least one forwarding resource is associated with a time resource and a beam index, wherein the MAC CE includes a bit field indicating activation or deactivation of the set of forwarding resources, and wherein the set of forwarding resources is activated or deactivated based on a first slot that is after 3 ms from the slot where the PUCCH including the HARQ-ACK information associated with the MAC CE is received.

6. The method of claim 5, wherein the time resource is defined based on a slot offset, a symbol offset and time duration in number of symbols.

7. The method of claim 5, wherein the configuration includes a periodicity and a subcarrier spacing for the set of forwarding resources.

8. The method of claim 5, wherein the configuration includes indices of the one or more sets of forwarding resources, wherein the MAC CE includes a field for indicating an index of the set of forwarding resources among the indices of the one or more sets of forwarding resources, and wherein a size of the field is defined based on a maximum number of the one or more sets of forwarding resources.

9. A network-controlled repeater (NCR) in a communication system, the NCR comprising:

a transceiver; and one or more processors communicatively coupled to the transceiver and configured to:

receive, from a base station via radio resource control information (RRC) message, configuration of one or more sets of forwarding resources for an access link, receive, from the base station, medium access control control element (MAC CE) indicating a set of forwarding resources among the one or more sets of forwarding resources, and transmit a physical uplink control channel (PUCCH) including hybrid automatic repeat request acknowledgement (HARQ-ACK) information associated with the MAC CE in a slot, wherein the set of forwarding resources comprises at least one forwarding resource, wherein each of the at least one forwarding resource is associated with a time resource and a beam index, wherein the MAC CE includes a bit field indicating activation or deactivation of the set of forwarding resources, and wherein the set of forwarding resources is activated or deactivated based on a first slot that is after 3 ms from the slot where the PUCCH including the HARQ-ACK information associated with the MAC CE is transmitted.

10. The NCR of claim 9, wherein the time resource is defined based on a slot offset, a symbol offset and time duration in number of symbols.

11. The NCR of claim 9, wherein the configuration includes a periodicity and a subcarrier spacing for the set of forwarding resources.

12. The NCR of claim 9, wherein the configuration includes indices of the one or more sets of forwarding resources, wherein the MAC CE includes a field for indicating an index of the set of forwarding resources among the indices of the one or more sets of forwarding resources, and wherein a size of the field is defined based on a maximum number of the one or more sets of forwarding resources.

13. A base station in a communication system, the base station comprising:

a transceiver; and one or more processors communicatively coupled to the transceiver and configured to:

transmit, to a network-controlled repeater (NCR) via radio resource control information (RRC) message, configuration of one or more sets of forwarding resources for an access link, transmit, to the NCR, medium access control control element (MAC CE) indicating a set of forwarding resources among the one or more sets of forwarding resources, and receive a physical uplink control channel (PUCCH) including hybrid automatic repeat request acknowledgement (HARQ-ACK) information associated with the MAC CE in a slot, wherein the set of forwarding resources comprises at least one forwarding resource, wherein each of the at least one forwarding resource is associated with a time resource and a beam index, wherein the MAC CE includes a bit field indicating activation or deactivation of the set of forwarding resources, and wherein the set of forwarding resources is activated or deactivated based on a first slot that is after 3 ms from the slot where the PUCCH including the HARQ-ACK information associated with the MAC CE is received.

14. The base station of claim 13, wherein the time resource is defined based on a slot offset, a symbol offset and time duration in number of symbols.

15. The base station of claim 13, wherein the configuration includes a periodicity and a subcarrier spacing for the set of forwarding resources.

16. The base station of claim 13, wherein the configuration includes indices of the one or more sets of forwarding resources, wherein the MAC CE includes a field for indicating an index of the set of forwarding resources among the indices of the one or more sets of forwarding resources, and wherein a size of the field is defined based on a maximum number of the one or more sets of forwarding resources.

* * * * *